(12) United States Patent
Hamaguchi et al.

(10) Patent No.: US 8,014,458 B2
(45) Date of Patent: Sep. 6, 2011

(54) TRANSMITTER

(75) Inventors: Yasuhiro Hamaguchi, Ichihara (JP); Kimihiko Imamura, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 65 days.

(21) Appl. No.: 12/551,385

(22) Filed: Aug. 31, 2009

(65) Prior Publication Data

US 2009/0316819 A1 Dec. 24, 2009

Related U.S. Application Data

(62) Division of application No. 12/091,430, filed as application No. PCT/JP2006/321563 on Oct. 27, 2006.

(30) Foreign Application Priority Data

Oct. 28, 2005 (JP) .................................. 2005-314429

(51) Int. Cl.
*H04L 27/28* (2006.01)
(52) U.S. Cl. ..................................................... 375/260
(58) Field of Classification Search ................... 375/259, 375/260, 295
See application file for complete search history.

(56) References Cited

U.S. PATENT DOCUMENTS

| | | | |
|---|---|---|---|
| 6,131,016 A | 10/2000 | Greenstein et al. | |
| 6,940,917 B2 | 9/2005 | Menon et al. | |
| 7,676,007 B1 | 3/2010 | Choi et al. | |
| 2002/0196734 A1 | 12/2002 | Tanaka et al. | |
| 2004/0072594 A1 | 4/2004 | Hwang et al. | |
| 2005/0099937 A1 | 5/2005 | Oh et al. | |
| 2005/0215224 A1 | 9/2005 | Hamamoto | |
| 2005/0220199 A1* | 10/2005 | Sadowsky et al. | 375/260 |
| 2005/0265226 A1 | 12/2005 | Shen et al. | |
| 2005/0286648 A1 | 12/2005 | Feng et al. | |
| 2006/0234643 A1 | 10/2006 | Kikuchi | |
| 2007/0004465 A1 | 1/2007 | Papasakellariou et al. | |
| 2007/0104288 A1 | 5/2007 | Kim | |
| 2008/0063012 A1 | 3/2008 | Nakao et al. | |
| 2009/0060064 A1 | 3/2009 | Futaki et al. | |
| 2009/0129492 A1 | 5/2009 | Hamaguchi et al. | |

FOREIGN PATENT DOCUMENTS

| | | |
|---|---|---|
| CN | 1674572 A | 9/2005 |
| CN | 1674574 A | 9/2005 |
| EP | 1 531 594 A1 | 5/2005 |
| JP | 2000-216748 A | 8/2000 |
| JP | 2000-354266 A | 12/2000 |
| JP | 2003-333008 A | 11/2003 |

(Continued)

OTHER PUBLICATIONS

A QoS-aware Proportional Fair Scheduler for Opportunistic OFDM, KTH Signals, Sensors and Systems, pp. 558-562 (2004).

(Continued)

*Primary Examiner* — Kevin M Burd
(74) *Attorney, Agent, or Firm* — Birch, Stewart, Kolasch & Birch, LLP

(57) ABSTRACT

A transmitter employing an OFDM system, having a phase rotating portion which gives a same phase rotation amount to each group configured with a plurality of consecutive subcarriers modulated by data or a known signal, a rotation amount determining portion which sets a phase rotation for each antenna set or each transmitter; and, and an allocating portion which allocates a plurality of groups to a receiver.

2 Claims, 20 Drawing Sheets

FOREIGN PATENT DOCUMENTS

| | | | |
|---|---|---|---|
| JP | 2004-135342 | A | 4/2004 |
| JP | 2004-24180 | A | 8/2004 |
| JP | 2005-537751 | A | 12/2005 |
| JP | 4302761 | B2 | 7/2009 |
| JP | 4347410 | B2 | 10/2009 |
| JP | 4382144 | B2 | 12/2009 |
| JP | 4384710 | B2 | 12/2009 |
| WO | WO 03/021829 | A1 | 3/2003 |
| WO | WO 2005060108 | A2 * | 6/2005 |
| WO | WO 2005/099211 | A1 | 10/2005 |

OTHER PUBLICATIONS

Liang Zhou et al., IEEE Vehicular Technology Conference, 2005. VTC-2005-Fall, vol. 1, 2005.9, pp. 583-587.

3GPP TSG RAN WG1 Meetings #42bis San Diego, USA, Oct. 10-14, 2005, pp. 1-8, R1-051046.

3GPP TSG RAN WG1 #42 on LTE, London, UK, Aug. 29-Sep. 2, 2005, R1-050795.

3GPP TSG RAN WG1 #42 on LTE, London, UK, Aug. 29-Sep. 2, 2005, R1-050704.

Ryoko Kawauchi et al., Technical Report of IEICE, WBS2004-124, A 2004-305, RCS2004-392, MoMuC2004-175, MW2004-302(Mar. 2005), pp. 13-17.

3GPP TSG RAN WG1 #42 on LTE, London, UK, Aug. 29-Sep. 2, 2005, R1-050700.

System Performance of Adaptive Cyclic Delay Diversity Scheme (ACDD), 3GPP TSG RAN WG1 Meeting #42bis, San Diego, USA, Oct. 10-14, 2005, pp. 1-9, R1-051047.

Improved Performance of the Cyclic Shift Diversity Scheme in E-UTRA Downlink, 3GPP TSG-RAN WG1#46, Tallinn, Estonia, Aug. 28-Sep. 1, 2006, pp. 1-6, R1-062255.

"Enhanced Frequency Diversity and Scheduling Performance in Evolved UTRA" Samsung Electronics Co. Ltd., 3GPP TSG RAN WG1 Meeting #42, London, UK, Aug. 29-Sep. 2, 2005. pp. 1-8. R1-050888.

Office Action dated Jan. 18, 2011 for U.S. Appl. No. 12/551,351.

Office Action dated Jan. 21, 2011 for U.S. Appl. No. 12/091,430.

Office Action dated Jan. 25, 2011 for U.S. Appl. No. 12/551,368.

Samsung, CQI report and scheduling procedure, 3GPP TSG-RAN WG1 Meeting #42bis Tdoc R1-051045, Oct. 10-14, 2005, pp. 1-4.

Notice of Allowance dated Apr. 19, 2011 for U.S. Appl. No. 12/091,430.

Office Action dated Apr. 18, 2011 in U.S. Appl. No. 12/551,351.

Office Action dated May 26, 2011 in U.S. Appl. No. 12/561,368.

* cited by examiner

TRANSMITTER

This application is a Divisional of co-pending application Ser. No. 12/091,430 filed on Apr. 24, 2008, which is a National Phase of PCT/JP2006/321563 filed on Oct. 27, 2006, and for which priority is claimed under 35 U.S.C. §120; and these applications claim priority of Application No. JP2005-314429 filed in Japan on Oct. 28, 2005 under 35 U.S.C. §119; the entire contents of all are hereby incorporated by reference.

TECHNICAL FIELD

The present invention relates to a transmitter employing an orthogonal frequency division multiplexing (OFDM) system.

Priority is claimed on Japanese Patent Application No. 2005-314429, filed Oct. 28, 2005, the content of which is incorporated herein by reference.

BACKGROUND ART

In recent years, multi-carrier transmission has been proposed that uses cyclic delay transmit (CDT) diversity that simultaneously performs transmission from a transmitter that is provided with a plurality of transmission antennas while adding a (cyclic) delay that differs for each transmission antenna (Non-patent document 1). When using this diversity method, since the frequency selectivity of channels can always be strongly achieved, excellent average bit error rate (BER) performance can be obtained.

Also, there is proposed, in Evolved UTRA and UTRAN of the 3rd Generation Partnership Project, a method of obtaining a superior average BER by adopting the aforementioned CDT diversity in a method called soft combining that can obtain a site diversity effect. In the soft combining, base stations, which are transmitters provided with a plurality of sectors, transmits signals using the same frequency and same time from transmitting antennas that belong to each sector particularly to the same receiver that is positioned near the sector edge so that a combined wave is received by the receiver side (Non-patent document 2).

FIG. 16 is a schematic drawing that shows the appearance of signals being transmitted from transmitting antennas 1a, 1b that are provided on transmitters belonging to two different sectors to a receiving antenna 2a that is provided on a receiver. As shown in the drawing, signals s1, s2 are respectively transmitted from the transmitting antenna 1a and the transmitting antenna 1b, and a combined wave is received by the receiving antenna 2a.

FIG. 17A shows a delay profile h1 that is time-domain representation of the propagation path between the transmitting antenna 1a (FIG. 16) and the receiving antenna 2a (FIG. 16). FIG. 17B shows a delay profile h2 that is time-domain representation of the propagation path between the transmitting antenna 1b (FIG. 16) and the receiving antenna 2a (FIG. 16). In FIG. 17A and FIG. 17B, the horizontal axis denotes time and the vertical axis denotes electrical power.

The signals s11 and s12 in FIG. 17A are signals s1 that are transmitted from the transmitting antenna 1a, and represent signals that have reached the receiving antenna 2a by passing along two different propagation paths. Also, the signals s21, s22, s23 are signals s2 that are transmitted from the transmitting antenna 1b, and represent signals that have reached the receiving antenna 2a by passing along three different propagation paths.

In the case where the signals s2 transmitted from the transmitting antenna 1b are signals generated by delaying the signals s1 transmitted from the transmitting antenna 1a, that is, in the case of adopting the CDT diversity between the transmitting antenna 1a and the transmitting antenna 1b, the transmitting signals can be regarded as having reached the receiving antenna 2a (FIG. 16) by passing through a propagation path that is a combination of the delay profiles h1 and h2, as shown in FIG. 18. However, the time domain t1 of FIG. 18 corresponds to the delay profile h1 (FIG. 17A), and the time domain t2 corresponds to the delay profile h2 (FIG. 17B).

By contrast, by multiplying an orthogonal code that is unique to each sector by a subcarrier for propagation path estimation between the respective sectors in which transmitters are placed, while transmitting the subcarriers for propagation path estimation using the same frequency and same time, the subcarriers for propagation path estimation from each sector are separated on the receiver side, and so propagation path estimation is individually performed (Non-patent documents 3 and 4).

FIG. 19A shows the constitution of a signal s1 that is transmitted from the transmitting antenna 1a (FIG. 16). The signal s1 is constituted from a region r1 and a region r2. In region r1 is disposed a symbol for propagation path estimation that is a known symbol, and in region r4 is disposed a common data channel that is a data symbol.

Also, FIG. 19B shows the constitution of a signal s2 that is transmitted from the transmitting antenna 1b (FIG. 16). The signal s2 is constituted from a region r3 and a region r4. In region r1 is disposed a symbol for propagation path estimation, and in region r4 is disposed a common data channel.

The symbols for propagation path estimation that are included in the regions r1 and r3 are used to obtain the propagation path information that is required for demodulating the data that is contained in the regions r2 and r4.

FIG. 20 is a configuration drawing of the signal s3 that is transmitted from three transmitters that belong to different sectors to a receiver. The signal s3 is constituted from sub-carriers sc1 to sc12. The sub-carriers sc1 to sc4, sc5 to sc8, and sc9 to sc12 are respectively included in the frequency ranges f1, f2, f3. The signals s31 to s33 represent signals that are transmitted from transmitters that are disposed in sectors #1 to #3. Orthogonal codes C1 (1, 1, 1, 1), C2 (1, −1, 1, −1), and C3 (1, 1, −1, −1) are respectively multiplied by the signals s31 to s33.

In the frequency range f1, the signal s31 that is transmitted from the transmitter that is arranged in sector #1 is included in the addition result, but the signals s32, s32 from the transmitters respectively arranged in sectors #2 and #3 become 0. It is therefore possible to separate each signal even by performing transmission of the signals s31 to s33 using the same frequency and the same time. This situation is referred to as "the orthogonality being maintained".

By contrast, in the case of applying the CDT diversity to the transmitting antennas that are arranged in the sectors #1 to #3, it is necessary to obtain the propagation path information from the symbols for propagation path estimation that are included in regions r1, r3 (FIG. 19A, 19B) in order to demodulate the regions r2, r4 (FIG. 19A, FIG. 19B) in the above manner. To this end, the signals that are transmitted from the transmitting antennas are normally added with the same delay to the regions r3, r4.

However, in the case of applying the CDT diversity to the transmitting antennas between sectors, since the orthogonality between orthogonal codes is lost, when attempting to separate and estimate the propagation paths between the transmitting antenna and receiving antennas of each sector using the symbols for propagation path estimation, there is the risk of an error occurring in the propagation path estimation result.

FIG. 21 is a drawing that shows the constitution of the transmission signal s4 in the case of the delay profiles h1=h2=1 in FIG. 17A and FIG. 17B, that is, a delay wave not existing and even in relation to a directly arriving wave, there is no change in the phase rotation and amplitude. The signal s4 is constituted from sub-carriers sc1 to sc12. The signals s41, s42 represent signals that are transmitted from transmitters respectively arranged in sectors #1 and #2. The code C4 (1, 1, 1, 1) is multiplied by the signals s41, 42.

Here, a description shall be given for the case of multi-carrier transmission being performed, and a delay of half of the symbol being added by the phase rotation described below between the transmission antennas 1a, 1b of FIG. 16. Also, diversity by the soft combining method shall be described for the case of being used between the transmitting antenna 1a and the transmitting antenna 1b. Here, for the time being only the signals transmitted from the transmitting antenna 1a and the transmitting antenna 1b shall be considered. Here, the soft combining method is a method of suppressing the interference component while increasing the signal component of the receiver by transmitting the same signal that is generated from the same data at the same timing from transmitters arranged in two sectors to the same receiver.

At this time, in the transmitted signals that are transmitted from the transmitting antenna 1a (FIG. 16), the phase rotation of the following Equation (1) is multiplied by the kth subcarrier.

$$\theta = 2\pi kT/N = 2\pi k \cdot N/2 \cdot 1/N = k\pi \quad (1)$$

At this time, the signal from the transmitting antenna 1a (FIG. 16) becomes as shown in FIG. 21, and so enters a state in which the orthogonality with the transmitted signal from the transmitting antenna 1a (FIG. 16) is lost.

Note that N in the abovementioned Equation (1) denotes the number of points of the inverse fast Fourier transform (IFFT) during multi-carrier modulation, and T denotes the delay point difference (delay time difference) between two transmitting antennas.

Furthermore, non-patent document 5 discloses a transmission method that involves transmitting with a format that retains the orthogonality between sectors adding a delay (rotation) only to the data portion even in the case of performing soft combining of signals for sector propagation path estimation. Also, it discloses that the delay amount can be informed from the base station to the transmitter.

As shown in non-patent document 5, this technology is premised on receiving the subcarrier for propagation path estimation that has not been delay processed by the receiver, utilizing the orthogonality to estimate the propagation path from each transmitter, and, based on the delay amount that is notified from the base station, estimating the propagation path during soft combining.

According to this method, since the orthogonality of the preamble portion is maintained, it is possible to accurately measure the strength of radio waves from the respective base stations, and it is possible to obtain the effect of soft combining.

Non-patent document 1: "Application of Cyclic Delay Transmit Diversity to DS-CDMA using Frequency-domain Equalization", IEICE Technical Report, RCS2004-392, March 2005.

Non-patent document 2: 3GPP, RI-050795, "Intra-Node B Macro Diversity based on Cyclic Delay Transmissions", [Sep. 7, 2005 search], Internet (URL: ftp://ftp.3gpp.org/TSG_RAN/WG1_RL1/TSGR1_42/Docs/R1-050795.zip)

Non-patent document 3: 3GPP, RI-050704, "Orthogonal Common Pilot Channel and Scrambling Code in Evolved UTRA Downlink", [Sep. 7, 2005 search], Internet (URL: ftp://ftp.3gpp.org/TSG_RAN/WG1_RL1/TSGR1_42/Docs/R1-050704.zip)

Non-patent document 4: 3GPP, RI-050700, "Intra-Node B Macro Diversity Using Simultaneous Transmission with Soft-combining in Evolved UTRA Downlink", [Sep. 7, 2005 search], Internet (URL: ftp://ftp.3gpp.org/TSG_RAN/WG1_RL1/TSGR1_42/Docs/R1-050700.zip)

Non-patent document 5: 3GPP, RI-051046, "Further Details on Adaptive Cyclic Delay Diversity Scheme", [Sep. 7, 2005 search], Internet (URL: ftp://ftp.3gpp.org/TSG_RAN/WG1_RL1/TSGR1_42bis/Docs/R1-051046.zip)

However, in the case of using the method disclosed in non-patent document 5, during soft combining, it is necessary to estimate the propagation path of the data portion by performing processing in the receiver different from during data receiving. Also, in a system that adaptively changes the delay amount, it is necessary to notify the receiver of the delay amount.

DISCLOSURE OF THE INVENTION

The present invention was achieved in view of the above circumstances, and has as its object to provide a transmitter that is capable of obtaining a multi-user diversity effect.

The transmitter of the present invention was achieved to resolve the aforementioned issues, and is a transmitter employing an OFDM system, having a phase rotating portion which gives a same phase rotation amount to each group configured with a plurality of consecutive subcarriers modulated by data or a known signal, a rotation amount determining portion which sets a phase rotation for each antenna set or each transmitter; and, and an allocating portion which allocates a plurality of groups to a receiver.

The transmitter of the present invention is a transmitter employing an OFDM system having a phase rotating portion which gives a same phase rotation amount to each group configured with a plurality of consecutive subcarriers modulated by data or a known signal, and a rotation amount determining portion which sets a phase rotation for each antenna set or each transmitter.

The transmitter of the present invention is a transmitter employing an OFDMA system which uses a frequency band that is constituted by a plurality of subchannels having a phase rotating portion which gives a same phase rotation amount to each group configured with a plurality of consecutive subcarriers modulated by data or a known signal in a portion or all of the subchannels, a rotation amount determining portion which sets a phase rotation for each antenna set or each transmitter, and a scheduling portion which sorts a data to a subchannel and determines an existence of the phase rotation.

The transmitter of the present invention includes in the groups a subcarrier modulated by a known signal for estimating a propagation path.

The transmitter of the present invention makes a number of subcarriers included in the group is same in all frequency bands.

The phase rotating portion of the transmitter of the present invention makes a difference of the phase rotation amount given to each group between adjacent groups being constant.

The phase rotating portion of the transmitter of the present invention takes one of the groups as a reference group and determines an absolute value of the phase rotation amount of that the reference group based on a state of a receiver.

The phase rotating portion of the transmitter of the present invention makes a difference of phase rotation amounts between groups being a unique value in each transmitter.

The transmitter of the present invention in which subcarrier modulation which needs an orthogonal relationship between subcarriers generating the group is performed.

The orthogonal relationship of the transmitter of the present invention is an orthogonal relationship of a subcarrier for propagation path estimation.

A communication system of the present invention is a communication system that performs communication between the transmitter and a receiver employing an OFDM system, in which the receiver includes an FFT portion which performs frequency conversion by an FFT on received OFDM symbol in which known symbol is contained, a propagation path estimating portion which estimates with respect to a plurality of transmitting antennas a propagation path that is the frequency response with a transmitting antenna in units of subcarrier for propagation path estimation that maintains orthogonality on the transmitter side, a quality estimating portion which estimates a quality of radio wave with respect to each transmitting antenna, and a quality calculating portion which calculates a quality of combined propagation path in case of providing a predetermined phase rotation to a subcarrier of the OFDM symbol that is transmitted from each transmitting antenna from the frequency response of each transmitting antenna.

A transmission method of the present invention is a transmission method employing an OFDM system, including the steps of, giving a same phase rotation amount to each group configured with a plurality of consecutive subcarriers modulated by a data symbol or a known symbol, determining the phase rotation amount for each antenna set or each transmitter, and transmitting signal added with the phase rotation in addition to modulation.

A transmission method of the present invention is a transmission method employing an OFDMA system, including the steps of, giving a same phase rotation amount to each group configured with a plurality of consecutive subcarriers modulated by a data symbol or a known symbol, determining the phase rotation amount for each antenna set or each transmitter, determining an existence of a phase rotation, and transmitting signal added with the existence of the phase rotation to the modulation and the phase rotation.

The transmission method of the present invention a criterion for grouping is an orthogonality of the subcarrier.

The orthogonality in the transmission method of the present invention is the orthogonality of the subcarrier for propagation path estimation.

Effects of the Invention

It is possible to obtain a multi-user diversity effect.

BRIEF DESCRIPTION OF THE DRAWINGS

FIG. 1B is a drawing that shows the constitution of a signal s5 that is transmitted from the transmitter 3a.

FIG. 18 is a drawing that shows the signal that is received by the receiving antenna 2a.

BEST MODE FOR CARRYING OUT THE INVENTION

Hereinbelow, embodiments of the present invention will be described with reference to the attached drawings. Note that the numeric values used in the embodiments of the present invention e.g. the numbers of frequency subchannels are merely examples.

In the first to third embodiments of the present invention, an orthogonal frequency division multiple access (OFDMA) system shall be described assuming that the number of frequency subchannels is 12, the number of subcarriers is 768, and the number of FFT points is 1,024. Also, the frequency subchannel that realizes the path diversity differs for every frame. That is, the description is given for the cases of whether or not to perform soft combining for each frequency subchannel or the delay amount being independently determined for each frequency subchannel, but is not limited thereto.

First Embodiment

Figure 1A:
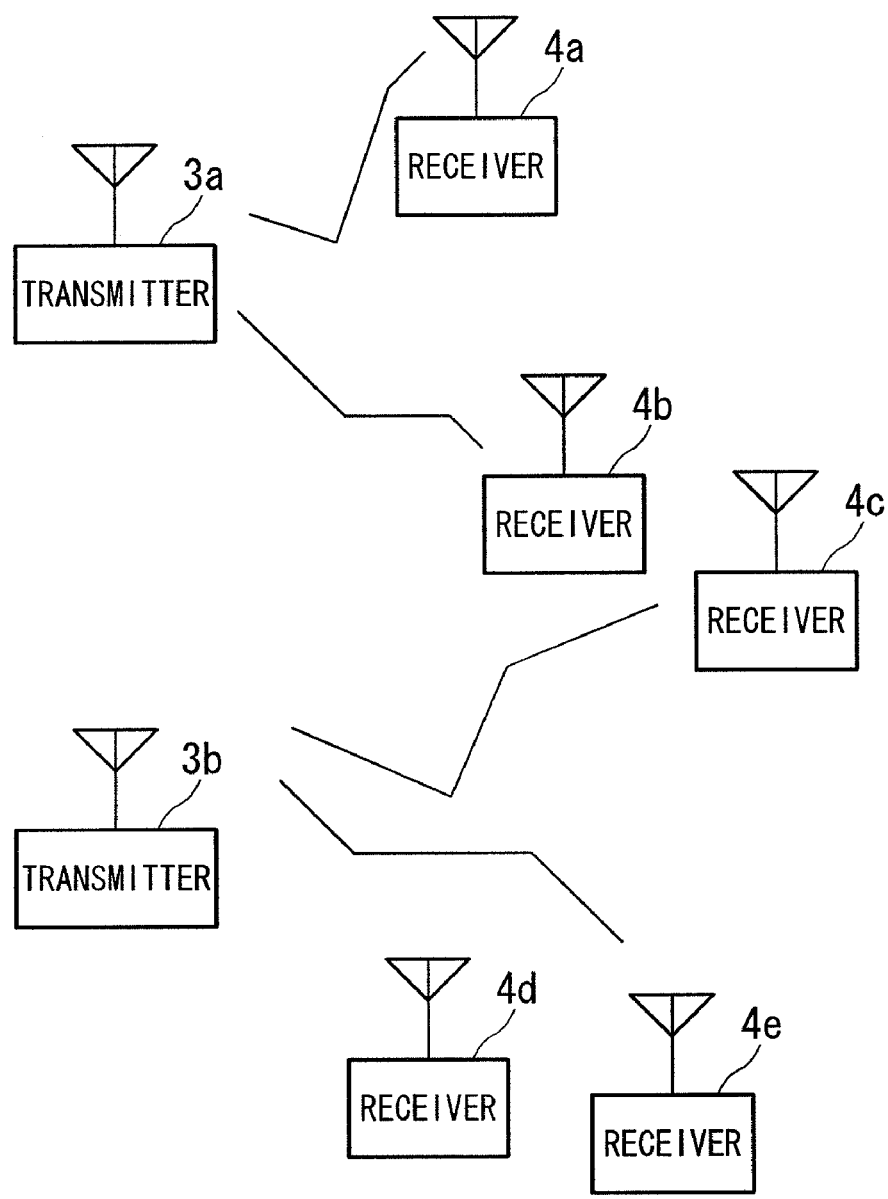
FIG. 1A is an outline view in the case of a transmitter and a receiver performing communication.

The first embodiment of the present invention will be described first. The present embodiment shows an example using two differing transmitters that use OFDMA and performing communication with some receivers. FIG. 1A is a schematic diagram of the case of transmitters communicating with receivers. During the time that the OFDMA frame that is the object of the description being transmitted, the receivers 4a to 4c perform communication with the transmitter 3a. Also, the receivers 4b to 4e perform communication with the transmitter 3b. That is, the receivers 4b and 4c combine and receive the same signals from both transmitters 3a and 3b by soft combining.

Figure 1B:
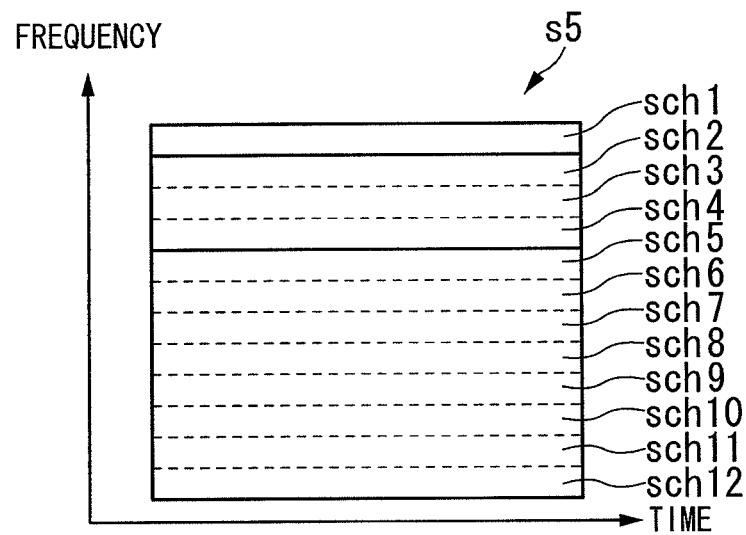
Figure 1C:
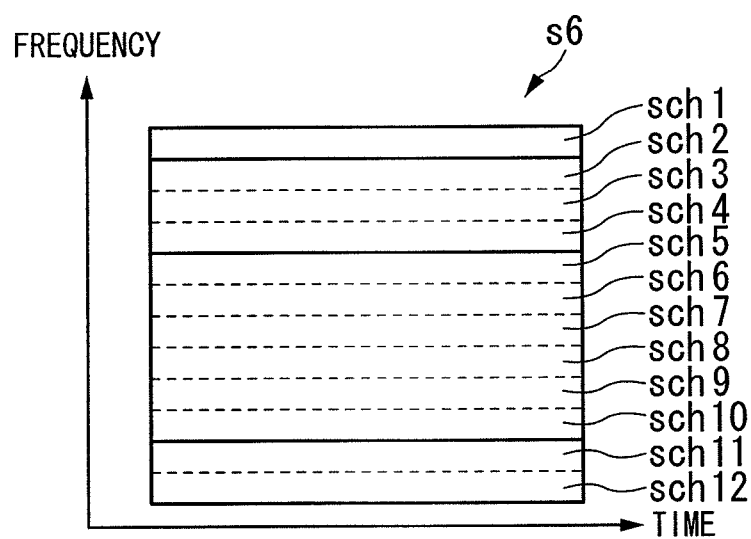
FIG. 1C is a drawing that shows the constitution of a signal s6 that is transmitted from the transmitter 3b.

FIG. 1B and FIG. 1C are drawings that show the constitution of the signals s5 and s6 that are transmitted from the transmitters 3a and 3b. In these drawings, the vertical axis represents frequency while the horizontal axis represents time. Here, the drawings show the case of the signals s5 and s6 each being constituted from 12 subchannels sch1 to sch12.

Here, as one example, the case of transmitting a signal from the transmitter 3a to the receiver 4b using the subchannel sch1 as shown in FIG. 1B will be described. Also, a signal is transmitted from the transmitter 3a to the receiver 4c using the subchannels sch2 to sch4. Also, a signal is transmitted from the transmitter 3a to the receiver 4a using the subchannels sch5 to sch12.

Also, as shown in FIG. 1C, a signal is transmitted from the transmitter 3b to the receiver 4b using the subchannel sch1. Also, a signal is transmitted from the transmitter 3b to the receiver 4c using the subchannels sch2 to sch4. Also, a signal is transmitted from the transmitter 3b to the receiver 4d using the subchannels sch5 to sch10. Also, a signal is transmitted from the transmitter 3b to the receiver 4e using the subchannels sch11 and sch12.

Accordingly, in the frequency band of the subchannel sch1, the same signal is transmitted from the transmitters 3a and 3b to the receiver 4b. Also, in the subchannels sch2 to sch4, the same signal is transmitted from the transmitters 3a and 3b to the receiver 4c.

Figure 2A:
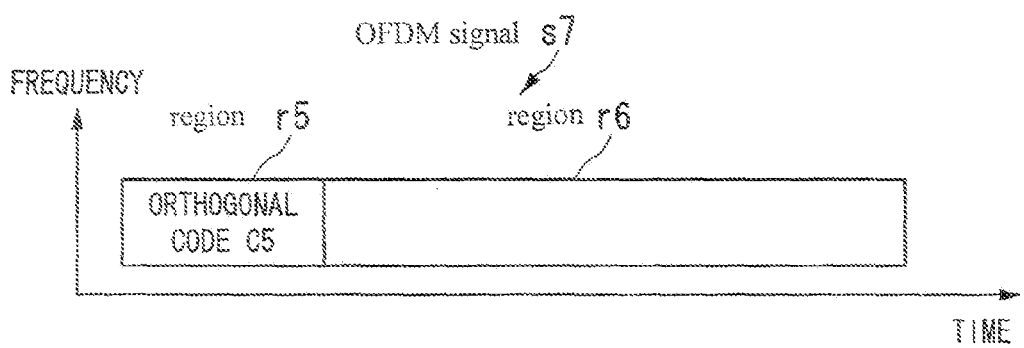
FIG. 2A is a drawing that shows the constitution of an OFDM signal s7 that is transmitted from the transmitter 3a (FIG. 1A).

FIG. 2A is a drawing that shows the constitution of an OFDM signal s7 that is transmitted from the transmitter 3a (FIG. 1A). Also, FIG. 2A is a drawing that shows the constitution of an OFDM signal s8 that is transmitted from the transmitter 3b (FIG. 1A). In these drawings, the vertical axis represents frequency while the horizontal axis represents time.

Regions r5, r7 that are included in the OFDM signals s7, s8 are subcarriers for propagation path estimation that are constituted by 1 OFDM symbol. Note that here a subcarrier for propagation path estimation is described in the case of being constituted by 1 OFDM symbol, but the subcarrier for propagation path estimation may be constituted by a plurality of OFDM symbols. Also, all of the subcarriers may be subcarriers for propagation path estimation, but an arrangement is also possible in which every other subcarrier is a subcarrier for propagation path estimation.

Also, regions r6, r8 that are included in the OFDM signals s7, s8 are OFDM symbols that transmit data, and are normally constituted by a plurality of OFDM symbols. In the region r5 and the region r7, orthogonal codes C5, C6 that are codes which are respectively orthogonal are allocated to each subcarrier.

Figure 3:
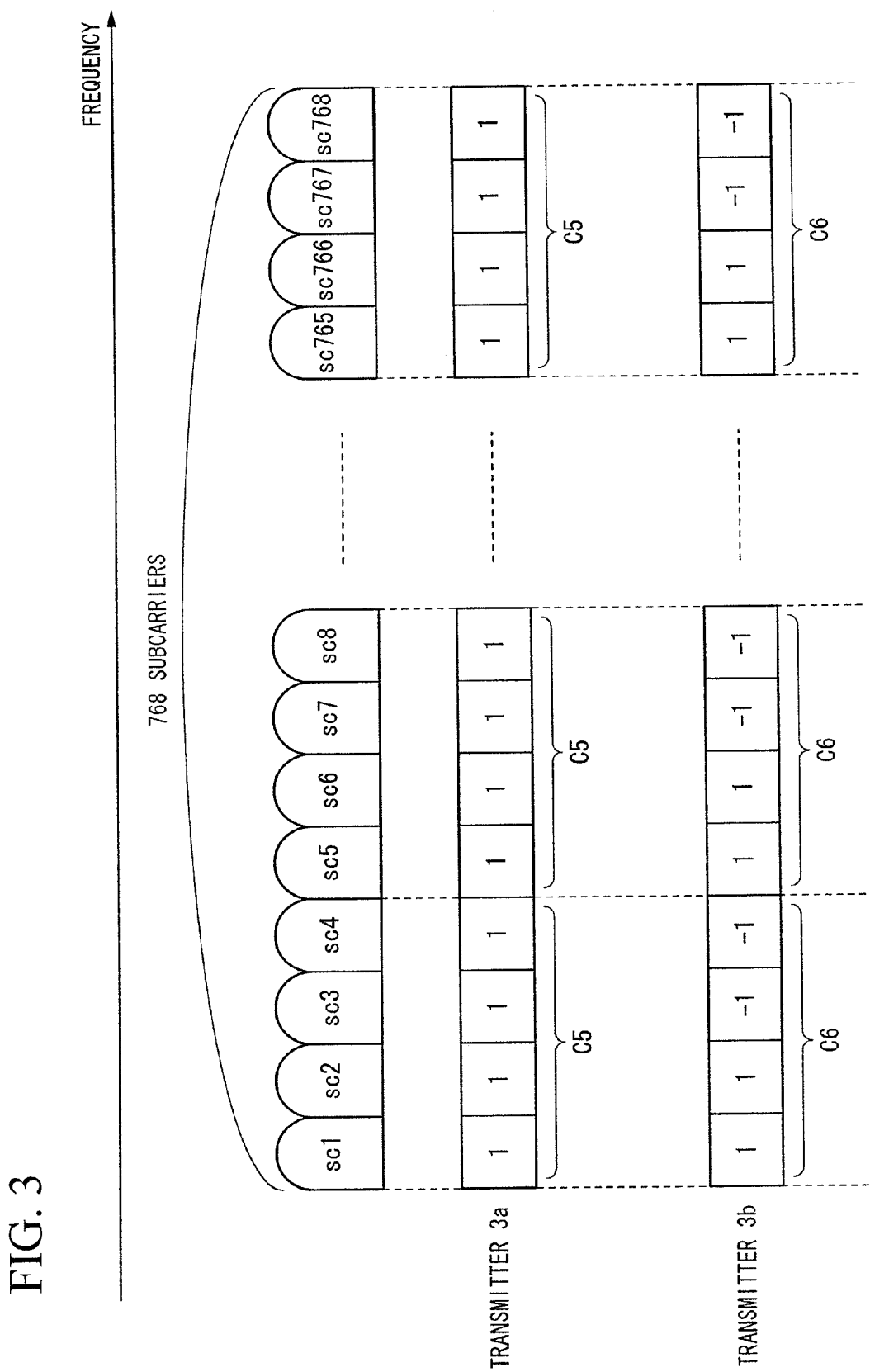
FIG. 3 is a drawing that shows the relation between the orthogonal code that is allocated in the present embodiment and the subcarriers.

FIG. 3 is a diagram that shows the relationship between the allocated orthogonal codes and the subcarriers in the present embodiment. In the transmitter 3a (FIG. 1A), the orthogonal code C5=(1, 1, 1, 1) is repeatedly allocated to 768 subcarriers. That is, one orthogonal code is repeatedly allocated to the subcarriers. Also, in the present embodiment, the number of subcarriers in each group to multiply the orthogonal code is 4. Note that the number of subcarriers per group in one or a plurality of subchannels may be made the same.

Also, in the transmitter 3b (FIG. 1A), the orthogonal code C6=(1, 1, −1, −1) is repeatedly allocated to 768 subcarriers. By calculating C5×C6*(* indicates the complex conjugate) and adding, the result is zero, therefore, C5 and C6 are in an orthogonal relationship.

Also, when these orthogonal codes C5, C6 are directly applied to the subcarriers for propagation path estimation, since the peak-average power ratio (PAPR) of the generated OFDM signals becomes extremely high, it is also possible to multiply all of the subcarriers by a same specified code (for example, a portion of the 10th-order M sequence).

Note that in the case of a code that is allocated to a $p^{th}$ ($1 \leq p \leq$ total number of subcarriers) subcarrier being Ck, Ck', the codes Ck, Ck' may be set such that m, that satisfies the relationship $Ck'=Ck \times e^{-j \times 2 \times p \times m \times \pi}$, exists.

Figure 4:
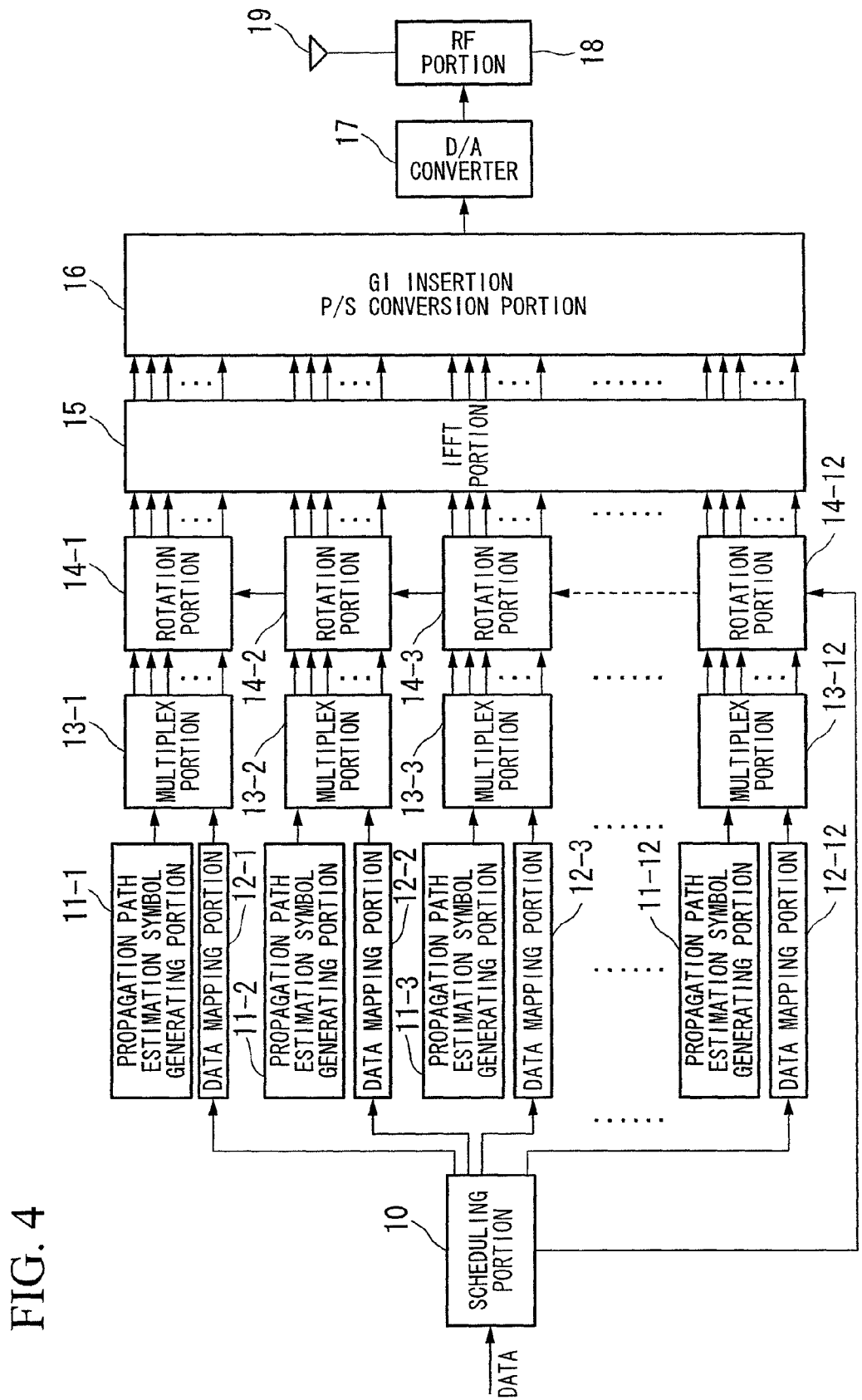
FIG. 4 is a block view that shows the constitution of the transmitter according to the first embodiment of the present invention.

FIG. 4 is a block diagram that shows the constitution of the transmitter according to the first embodiment of the present invention. This transmitter has a scheduling portion 10, propagation path estimation symbol generating portions 11-1 to 11-12, data mapping portions 12-1 to 12-12, multiplex portions 13-1 to 13-12, rotation portions 14-1 to 14-12, IFFT portion 15, GI (guard interval) insertion P/S (parallel/serial) conversion portion 16, D/A (digital/analog) converter 17, RF (radio frequency) portion 18, and transmitting antenna 19.

The scheduling portion 10 sorts data that is input to the transmitter to each subchannel. Here, the case of 12 subchannels shall be described. Also, the scheduling portion 10 outputs control signals to the rotation portions 14-1 to 14-12.

The propagation path estimation symbol generating portions 11-1 to 11-12 generate symbols for propagation path estimation of each subchannel. The data mapping portions 12-1 to 12-12 perform error correction in the data to be transmitted, and perform modulation in every allocated subcarrier. Also, a code allocation portion (not illustrated) of the propagation path estimation symbol generating portions 11-1 to 11-12 allocates code of a code length that is orthogonal with another transmitter to every subcarrier.

The multiplex portions 13-1 to 13-12 select any of the symbols for propagation path estimation that are input data symbols or known symbols.

The rotation portions 14-1 to 14-12 apply rotation to each subcarrier base on the control signal that is output from the scheduling portion 10. The IFFT portion 15 converts the signal of the frequency domain to a signal of the time domain by performing an inverted fast Fourier transformation on the signals that are output from the rotation portions 14-1 to 14-12. Here, in the case of handling 768 subcarriers, the number of points of the inverted fast Fourier transformation is 1024.

The GI insertion·P/S conversion portion 16 inserts guard intervals for attempting a reduction in inter-symbol interference. Also, it converts parallel signals to serial signals. The D/A converter 17 converts digital signals to analog signals. The RF portion 18 converts analog signals until a frequency band to be transmitted, and performs waveform reshaping. The transmitting antenna 19 transmits radio waves to a receiver.

Figure 5:
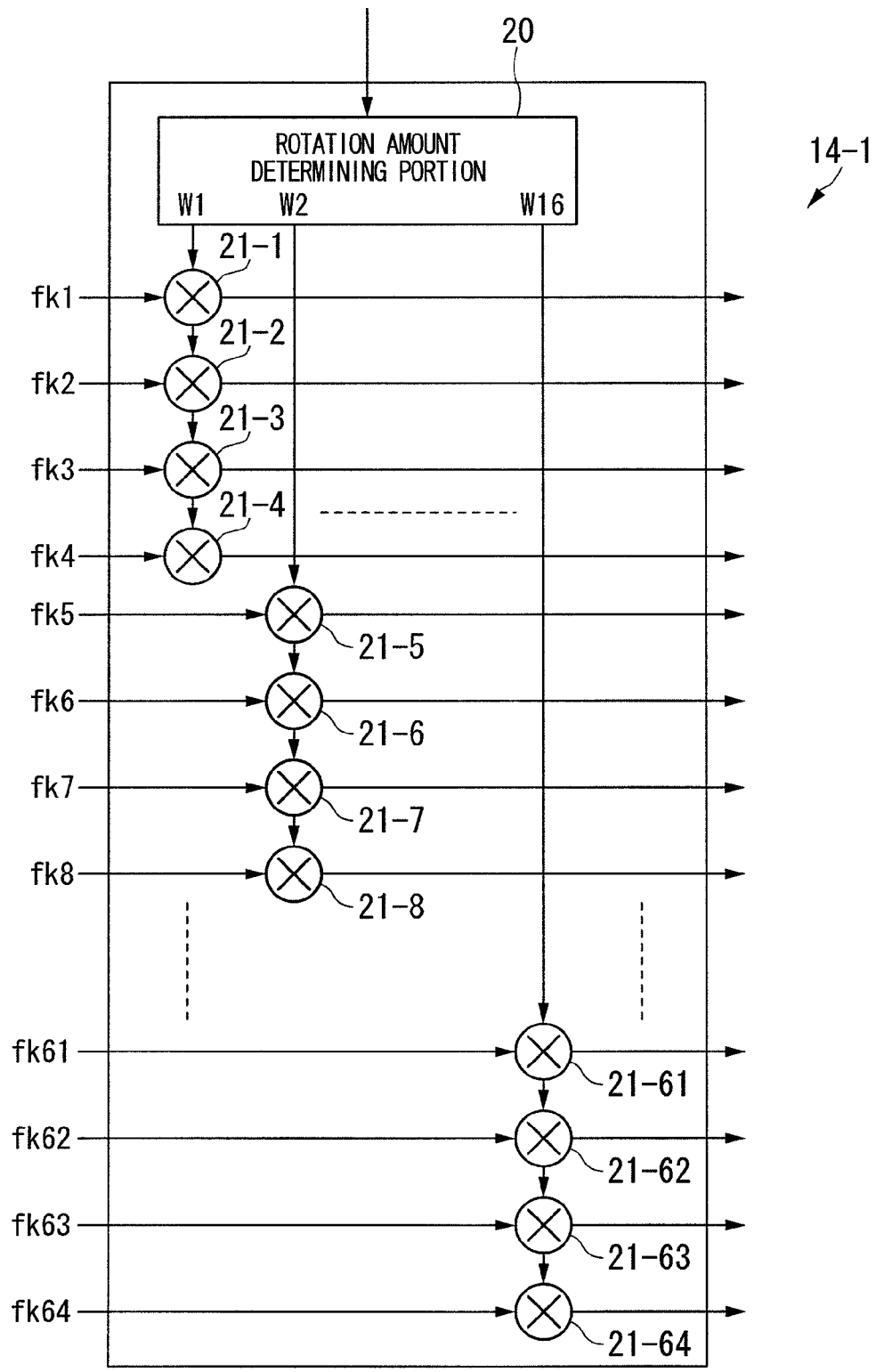
FIG. 5 is an outline view of a rotation portion 14-1 (FIG. 4) according to the first embodiment of the present invention.

FIG. 5 is a configuration diagram of the rotation portion 14-1 (FIG. 4) according to the first embodiment of the present invention. This rotation portion 14-1 has a rotation amount determining portion 20, and complex multiplier portions 21-1 to 21-64.

The rotation amount determining portion 20 determines rotation amounts W1 to W16 for every four subcarriers (each W1 to W 16 is a real number or a complex number, and the amplitude thereof is "1") based on a control signal that is output from a scheduling portion 10 (FIG. 4). Note that the rotation amount determining portion 20 may perform control so that the phase rotation amount difference between adjacent groups is the same. Also, it may make the phase rotation amount difference between adjacent groups within one or a plurality of subchannels the same. Also, one of the groups within a subchannel in which the phase rotation amount difference is set to be the same may be made a reference group, and the absolute value of the phase rotation amount of that group may be determined based on the propagation path state of the receiver. Also, the rotation amount determining portion 20 may provide a unique phase rotation amount difference to each transmitter, and may provide a phase rotation to the subcarriers of all the OFDM symbols using the rotation amount.

Also, by setting W1=W2, W3=W4, . . . , W15=W16, it is possible to change the number of subcarriers that generates groups.

The complex multiplier portions 21-1 to 21-64 multiply input signals fk1 to fk64 and the rotation amounts W1 to W16. Here, there are input signals (fk1 to fk64), because 768 subcarriers are used as 12 subchannels, and so the number of subcarriers used per subchannel is 64. Also, the reason for determining the rotation amount (W1 to W16) for every 4 subcarriers is that it is possible to maintain the orthogonal relationship by making them identical among the four subcarriers. This is because the subcarriers for propagation path estimation are in an orthogonal relationship with the four subcarriers.

Next, the operation of the transmitter 3a (FIG. 1A) according to the first embodiment of the present invention will be described. The signals that are transmitted to the receivers 4b and 4c are transmitted from the transmitter 3b as well, so a rotation is provided to the signal that is transmitted from the transmitter 3a. Here, a description will be given for the case of the rotation amount of the signal that is transmitted to the receiver 4b being 1, and rotation amount of the signal that is transmitted to the receiver 4c being 2.

When data is input to the transmitter 3a, the data that is to be transmitted to the receiver 4b is output to the data mapping portion 12-1, the data that is to be transmitted to the receiver 4c is output the data mapping portions 12-2 to 12-4, and the data that is to be transmitted to the receiver 4a is output from the data mapping portions 12-5 to 12-12 by the scheduling portion 10 (FIG. 4).

Figure 2B:
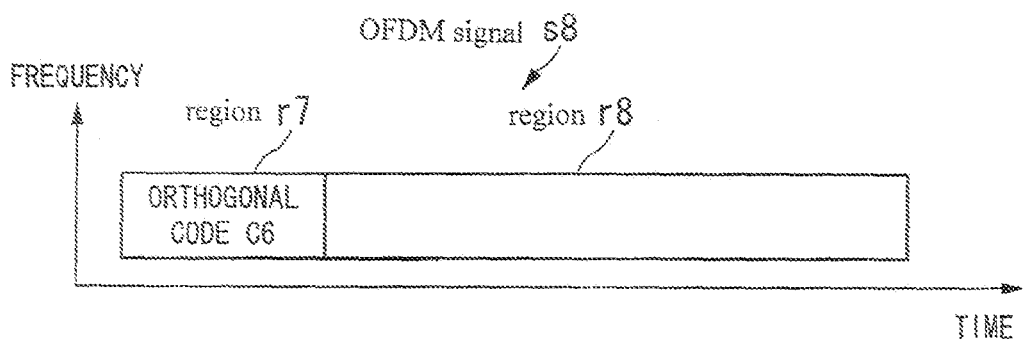
FIG. 2B is a drawing that shows the constitution of an OFDM signal s8 that is transmitted from the transmitter 3b (FIG. 1A).

Prior to the transmission of data, based on the constitution of the signal of FIG. 2A and FIG. 2B, the symbol for propagation path estimation is selected by the multiplex portions 13-1 to 13-12, and output to the rotation portions 14-1 to 14-12. In the case of the transmitter 3a, the symbols for propagation path estimation that are generated by the propagation path estimation symbol generating portions 11-1 to 11-12 are those in which the orthogonal code C5 is repeated 16 times. The identical orthogonal code C5 is therefore used for all of the propagation path estimation symbol generating portions 11-1 to 11-12.

A control signal is output from the scheduling portion 10 to the rotation portions 14-1 to 14-12, 1 is input as the rotation amount to the rotation portion 14-1, 2 is input as the rotation amount from the rotation portion 14-2 to the rotation portion 14-4, and 0 is input as the rotation amount from the rotation portion 14-5 to the rotation portion 14-12.

In the rotation portion 14-1 shown in FIG. 5, based on the control code that is output from the scheduling portion 10, the rotation amounts W1 to W 16 are determined. In order to realize the case of the rotation amount of m, since the phase rotation amount between each subcarrier may be $2 \times \pi \times m/$ (IFFT point number), the difference between the rotation amounts W1 and W2 is four subcarriers, and so by multiplying by 4, it is determined to be $2 \times \pi \times m \times 4/1024$.

When this is applied to the preceding example, the phase difference between Wk and Wk+1 (k is an integer from 1 to 15) in the rotation portion 14-1 is $2 \times \pi \times 4/1024$, and the phase difference between Wk and Wk+1 in the rotation portions 14-2 to 14-4 is $2 \times \pi \times 2 \times 4/1024$, and the phase difference between Wk and Wk+1 in the rotation portions 14-5 to 14-12 is 0.

The absolute phase of the rotation amount W1 of each rotation portion is not particularly limited.

However, in the case of using a plurality of subchannels such as with the signal to be transmitted to the receiver 4c (FIG. 1A), it is preferable that the rotation amounts of adjacent subchannels are made the same. That is, the absolute phase difference of the rotation amount W16 of the rotation portion 14-2 and the rotation amount W1 of the rotation portion 14-3 is preferably $2 \times \pi \times 2 \times 4/(1024)$.

Also, in a system that is capable of acquiring information from a receiver, the absolute phase of the rotation amount W1 can be determined with reference to the data that is to be transmitted from the receiver.

Then, for the data as well, the identical rotation amount as during transmission of the subcarriers for propagation path estimation is provided to all of the subcarriers.

FIG. 5 shows multipliers for providing the phase rotation in the respective subcarriers that provide the same rotation, but this is in order to simplify the description. It is possible to decrease the circuit scale by performing the process serially with one multiplier.

Next, the receiver will be described.

Figure 6:
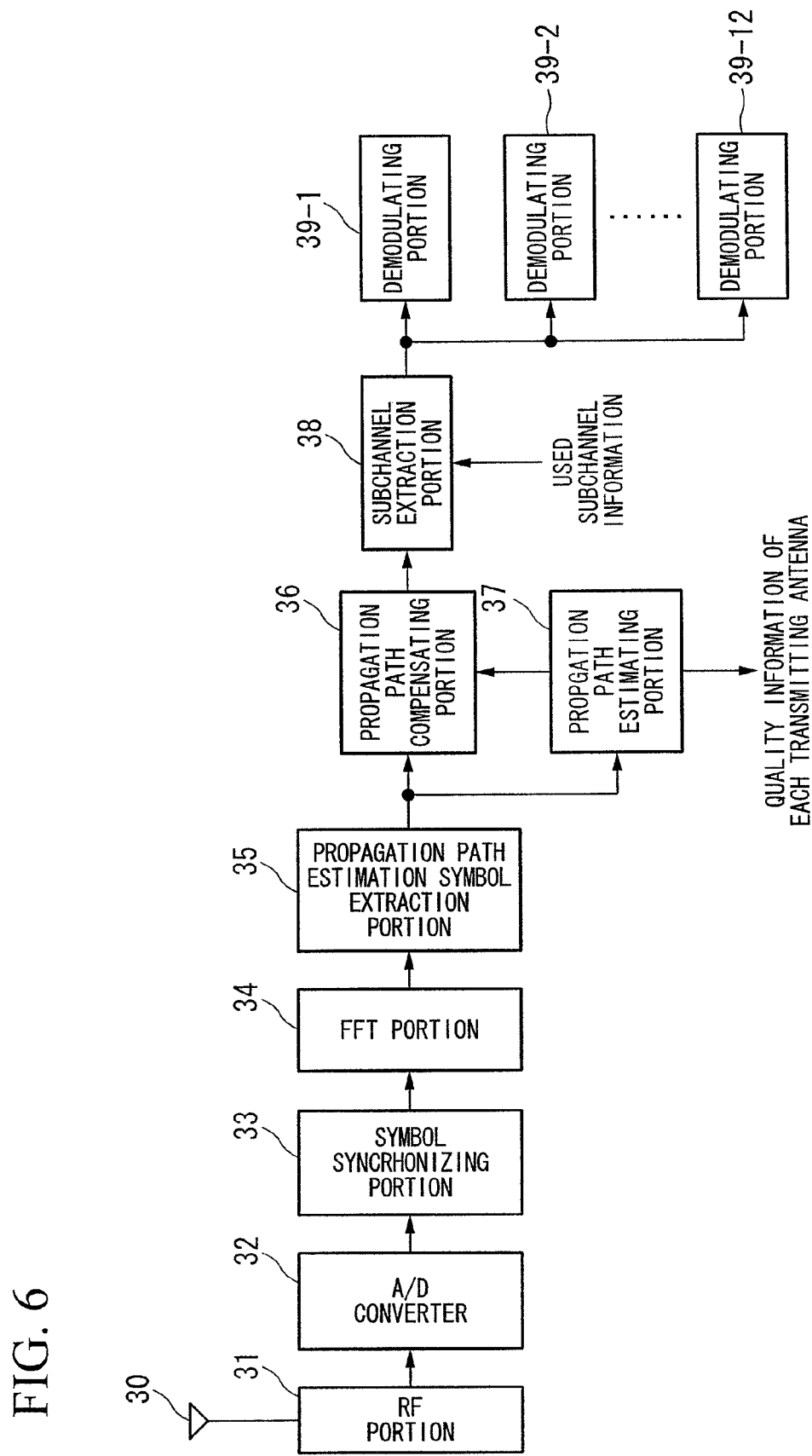
FIG. 6 is a block view that shows the constitution of the receiver according to the first embodiment of the present invention.

FIG. 6 is a block diagram that shows the constitution of a receiver of the first embodiment of the present invention. This receiver has a receiving antenna 30, an RF portion 31, an analog/digital (A/D) converter 32, a symbol synchronizing portion 33, a fast Fourier transform (FFT) portion 34, a propagation path estimation symbol extraction portion 35, a propagation path compensating portion 36, a propagation path estimating portion 37, a subchannel extraction portion 38, and demodulating portions 39-1 to 39-12.

The receiving antenna 30 receives signals that are transmitted from the transmitter. The RF portion 31 reshapes signals that the receiving antenna 30 has received and lowers the frequency until the frequency band that can be subject to A/D conversion. The A/D converter 32 converts analog signals to digital signals.

The symbol synchronizing portion 33 performs synchronization to the OFDM signal. The FFT portion 34 performs a fast Fourier transform on the received OFDM symbol. The propagation path estimation symbol extraction portion 35 separates the frequency converted OFDM signal from the propagation path estimation symbol and the data symbol, outputs the propagation path estimation symbol to the propagation path estimating portion 37, and outputs the data symbol to the propagation path compensating portion 36.

The propagation path compensating portion 36 compensates the data propagation path based on propagation path estimation information. The propagation path estimating portion 37 estimates the propagation path information from the propagation path estimation symbol, and estimates the quality of every transmitting antenna. The subchannel extraction portion 38 extracts the signals that the receiver demodulates based on the subchannel in use of information from a control portion not illustrated.

The demodulating portions 39-1 to 39-12 perform demodulation in subchannel units based on the number of subchannels used. This receiver has a constitution that once demodulates all bands that are used by the OFDMA, and subsequently extracts only the subchannels that are required, but is not necessarily limited to this constitution.

Figure 7:
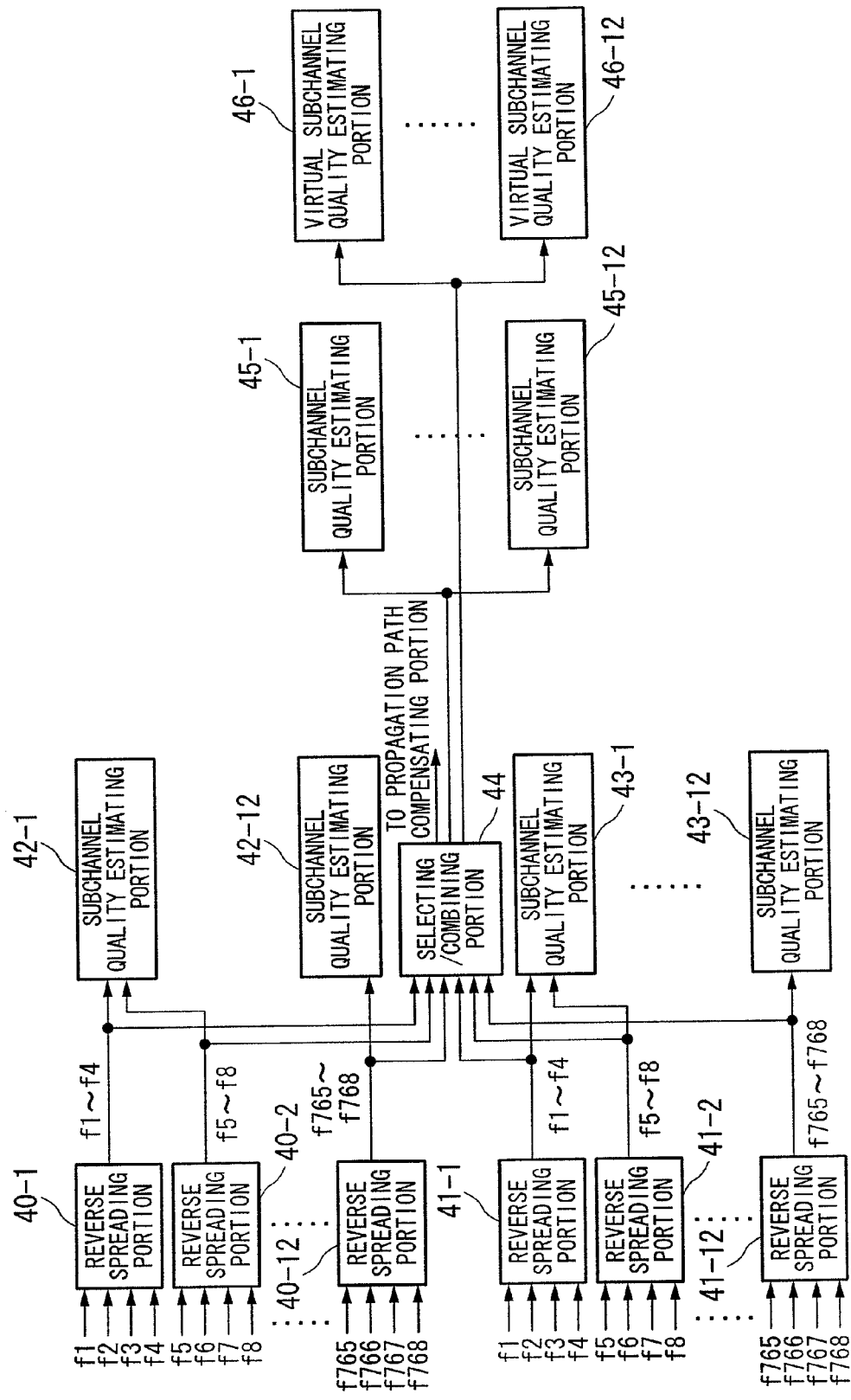
FIG. 7 is an outline view of the propagation path estimating portion 37 according to the first embodiment of the present invention.

FIG. 7 is a lineblock diagram of the propagation path estimating portion 37 (FIG. 6) according to the first embodiment of the present invention. The propagation path estimating portion 37 has reverse spreading portions 40-1 to 40-12, 41-1 to 41-12, subchannel quality estimating portions 42-1 to 42-12, 43-1 to 43-12, a selecting/combining portion 44, subchannel quality estimating portions 45-1 to 45-12, and virtual subchannel quality estimating portions 46-1 to 46-12.

The reverse spreading portions are provided in two pair (reverse spreading portions 40-1 to 40-12, and reverse spreading portions 41-1 to 41-12) because signals are transmitted from the two transmitters 3a and 3b (FIG. 1A).

The reverse spreading portions 40-1 to 40-12 estimate the propagation paths of signals that are transmitted from the transmitter 3a (FIG. 1A). The reverse spreading portions 41-1 to 41-12 estimate the propagation paths of signals that are transmitted from the transmitter 3b (FIG. 1A). The complex signals that are obtained by the reverse spreading portions 40-1 to 40-12, 41-1 to 41-12 are input to the selecting/combining portion 44.

The selecting/combining portion 44 selects the reverse spreading result on the transmitting side in the case that the communication currently performed is in use of only one transmitter (the receivers 4a, 4d, 4e in FIG. 1A). If the receiver 4a is in use, it selects the output of the reverse spreading portions 40-1 to 40-12. If the receivers 4d, 4e are in use, it selects the output of the reverse spreading portions 41-1 to 41-12.

By contrast, in a receiver that receives signals from both the transmitters 3a, 3b in the manner of the receivers 4b, 4c (FIG. 1A), the selecting/combining portion 44 performs combining of the signals that are received. This is achieved by vector addition of the outputs of the reverse spreading portions 40-1 to 40-12 and the reverse spreading portions 41-1 to 41-12.

The subchannel quality estimating portions 42-1 to 42-12 estimate the quality of the signals that are transmitted from the respective transmitters 3a, 3b based on the output of the reverse spreading portions 40-1 to 40-12. Also, the subchannel quality estimating portions 43-1 to 43-12 estimate the quality of the signals that are transmitted from the respective transmitters 3a, 3b based on the output of the reverse spreading portions 41-1 to 41-12. In the case of the present embodiment, the propagation path estimation result of the 64 subcarriers used by each subchannel are input to the subchannel quality estimating portions 42-1 to 42-12, 43-1 to 43-12.

The subchannel quality estimating portions 45-1 to 45-12 perform quality estimation after the combination of the signals transmitted from the transmitters 3a, 3b (FIG. 1A) based on the output of the selecting/combining portion 44.

The virtual subchannel quality estimating portions 46-1 to 46-12 provide either rotation to the propagation path information in the case of having received the subcarriers for propagation path estimation in which rotation has not been added at the transmitter side, and estimates the quality of the subchannel in the case of the rotation being performed. Thereby, when moving to communication with two transmitters from one transmitter, it is possible to request the optimum subchannel from the receiver.

The simplest method of propagation path estimation methods is a method of multiplying a complex conjugate signal of a code for each subcarrier of the subcarriers for propagation path estimation used on the transmitter side with respect to the signals in which the received subcarriers for propagation path estimation are frequency converted. However, since orthogonal codes are here used between the transmitting antennas that differ between the subcarriers for propagation path estimation, the description is given for the method of propagation path estimation by reverse spreading.

Figure 8:
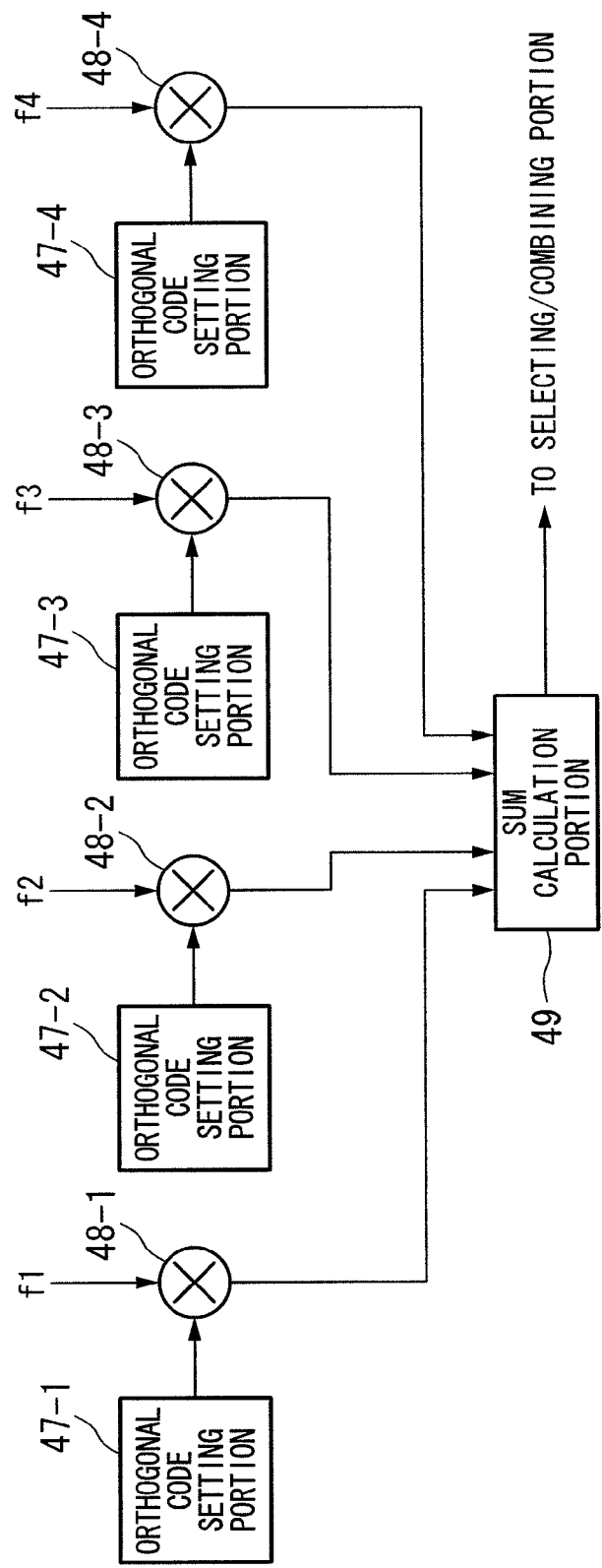
FIG. 8 is an outline view of the reverse spreading portion 40-1 (FIG. 7) according to the first embodiment of the present invention.

FIG. 8 is a lineblock diagram of the reverse spreading portion 40-1 (FIG. 7) according to the first embodiment of the present invention. The reverse spreading portion 40-1 has orthogonal code setting portions 47-1 to 47-4, complex multipliers 48-1 to 48-4, and a sum calculation portion 49.

For example, in the case of performing a reverse spreading of the subcarriers for propagation path estimation that are transmitted from the transmitter 3a (FIG. 1A), (1, 1, 1, 1) which is the complex conjugate of the orthogonal code C 1 is set in the orthogonal code setting portion 47-1. Also, in the case of performing a reverse spreading of the subcarriers for propagation path estimation that are transmitted from the transmitter 3b, (1, 1, −1, −1) which is the complex conjugate of the orthogonal code C2 is set in the orthogonal code setting portion 47-2.

In the complex multipliers 48-1 to 48-4, these orthogonal codes are complex multiplied by the input signals f1 to f4, and by adding and dividing by 4 in the sum calculation portion 49, it is possible to obtain the propagation path in this frequency band.

As stated above, in the case of constituting an OFDM communication system using the transistor and receiver of this embodiment, it is possible to simply demodulate a transmitted signals from both without notifying information of the rotation amount that is used on the transmitter side or determining it in advance. Also, since the subcarriers for propagation path estimation maintain orthogonality, it is possible to simply perform quality estimation for each subchannel from each transmitting antenna or quality estimation after combining. Also, by providing a function in the receiver that virtually estimates the quality of each subchannel after combining, it is possible to accurately start reception when starting the combined reception.

The aforementioned first embodiment discloses the transmitter that uses the OFDMA system which utilizes a frequency band that is constituted by a plurality of subchannels. The transmitter allocates, to each of n subcarriers (where n is an integer of 1 or more), code Ck of code length Mk that is orthogonal with another transmitter by a code allocating portion of propagation path estimation symbol generating portions 11-1 to 11-12. The transmitter performs grouping n×Mk subcarriers by complex multiplier portions 21-1 to 21-64 (phase rotating portions), gives the same phase rotation to every group, determines the phase rotation amount in subchannel units by the rotation amount determining portion 20, and determines the existence of phase rotation in subchannel units by the scheduling portion 10.

By adopting such a constitution, in the case of using the OFDMA system, by allocating code that is orthogonal with each of the subcarriers of one group with the rotation amount determining portion 20, it is possible to maintain the orthogonality of each group. Therefore, it is possible to prevent deterioration in the reception quality of the receiver due to interference of subcarriers between groups. Also, since the orthogonal code is allocated to every group, compared to the case of orthogonal code being allocated to every subcarrier, it is possible to simplify the processing on the receiver side.

Note that the transmitter may also be a transmitter that uses the OFDM system, with the transmitter allocating, to each of n subcarriers (where n is an integer of 1 or more), code Ck of code length Mk that is orthogonal with another transmitter by a code allocating portion of propagation path estimation symbol generating portions 11-1 to 11-12, grouping n×Mk subcarriers by complex multiplier portions 21-1 to 21-64 (phase rotating portions). The transmitter may provide the same phase rotation to every group, determine the phase rotation amount by the rotation amount determining portion 20, and determine the existence of phase rotation in subchannel units by the scheduling portion 10.

By adopting such a constitution, in the case of using the OFDM system, it is possible to attach a delay difference to signals that are transmitted from a plurality of transmitters since a rotation amount that is different from a group that another transmitter transmits is allocated to a group by the rotation amount determining portion 20, and so it is possible to obtain a multi-user diversity effect and a frequency diversity effect.

Note that here since the example of allocating code of code length Mk as propagation path estimating code to each of n subcarriers was shown, a group that provided the same phase rotation is made to be n×Mk, but in the case of using a propagation path estimating method that does not utilize orthogonality, this kind of limitation is not required in order to obtain the abovementioned effect. In such a case, subcarriers of another number may be set as 1 group without making n×Mk subcarriers 1 group.

Second Embodiment

Next, a second embodiment of the present invention will be described. It is one that allows further simplification of the constitution of the receiver with respect to the first embodiment of the present invention.

Figure 9:
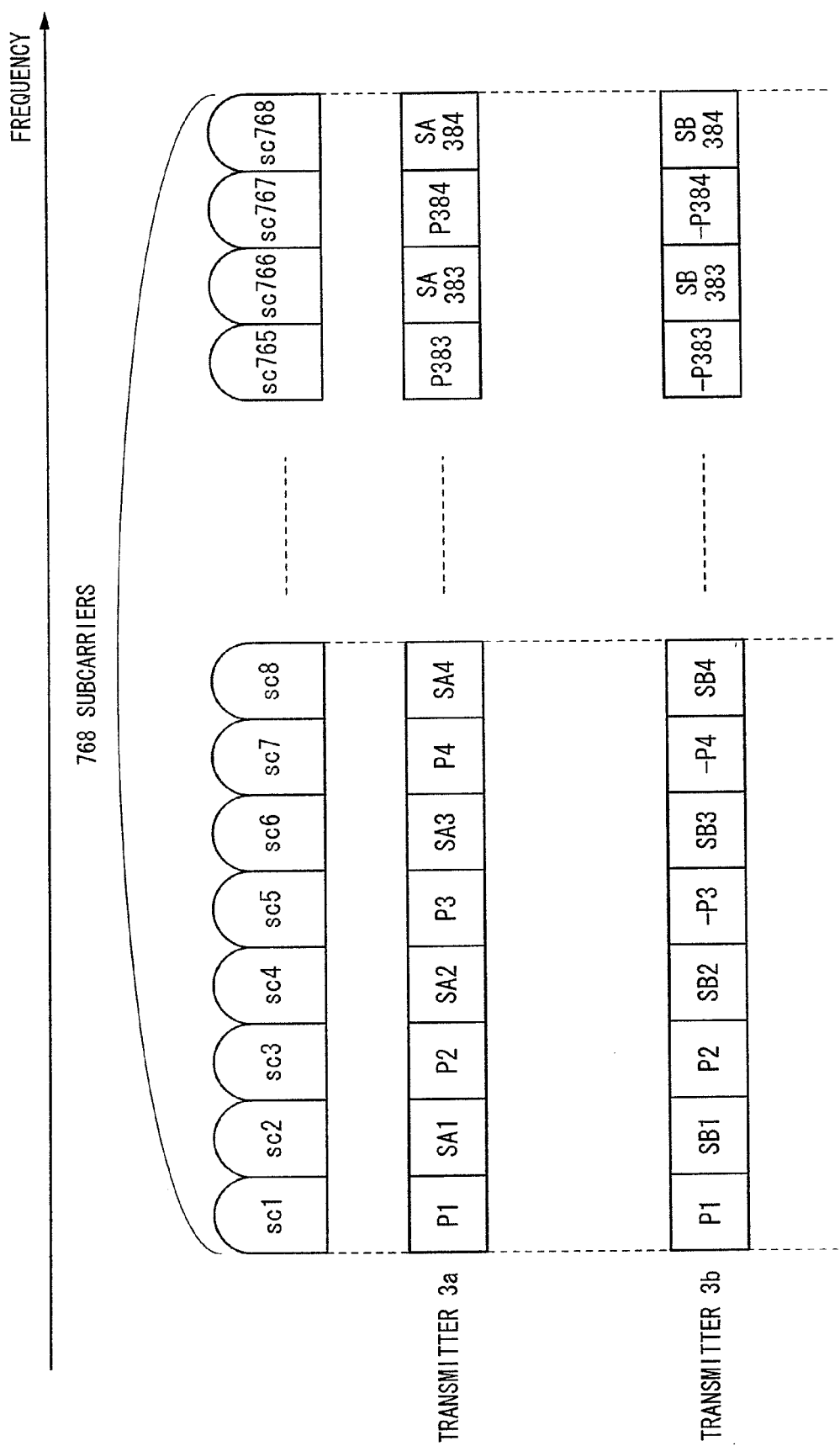
FIG. 9 is a drawing that shows the constitution of the subcarrier for propagation path estimation according to the second embodiment of the present invention.

FIG. 9 is a diagram that shows the constitution of a subcarrier for propagation path estimation in the second embodiment of the present invention. In this embodiment, the subcarrier for propagation path estimation, which is a subcarrier in which symbols for propagation path estimation are arranged, is allocated at every other subcarrier. A subcarrier in which a subcarrier for propagation path estimation is not allocated is used for communication of control signals (SA1 to SA384, SB1 to SB384). Also, specific known symbols (P1 to P384) are used for the symbols for propagation path estimation, and orthogonal codes (1, 1, 1, 1), (1, 1, −1, −1) are respectively multiplied by the known symbols in the transmitters 3a, 3b.

Figure 10:
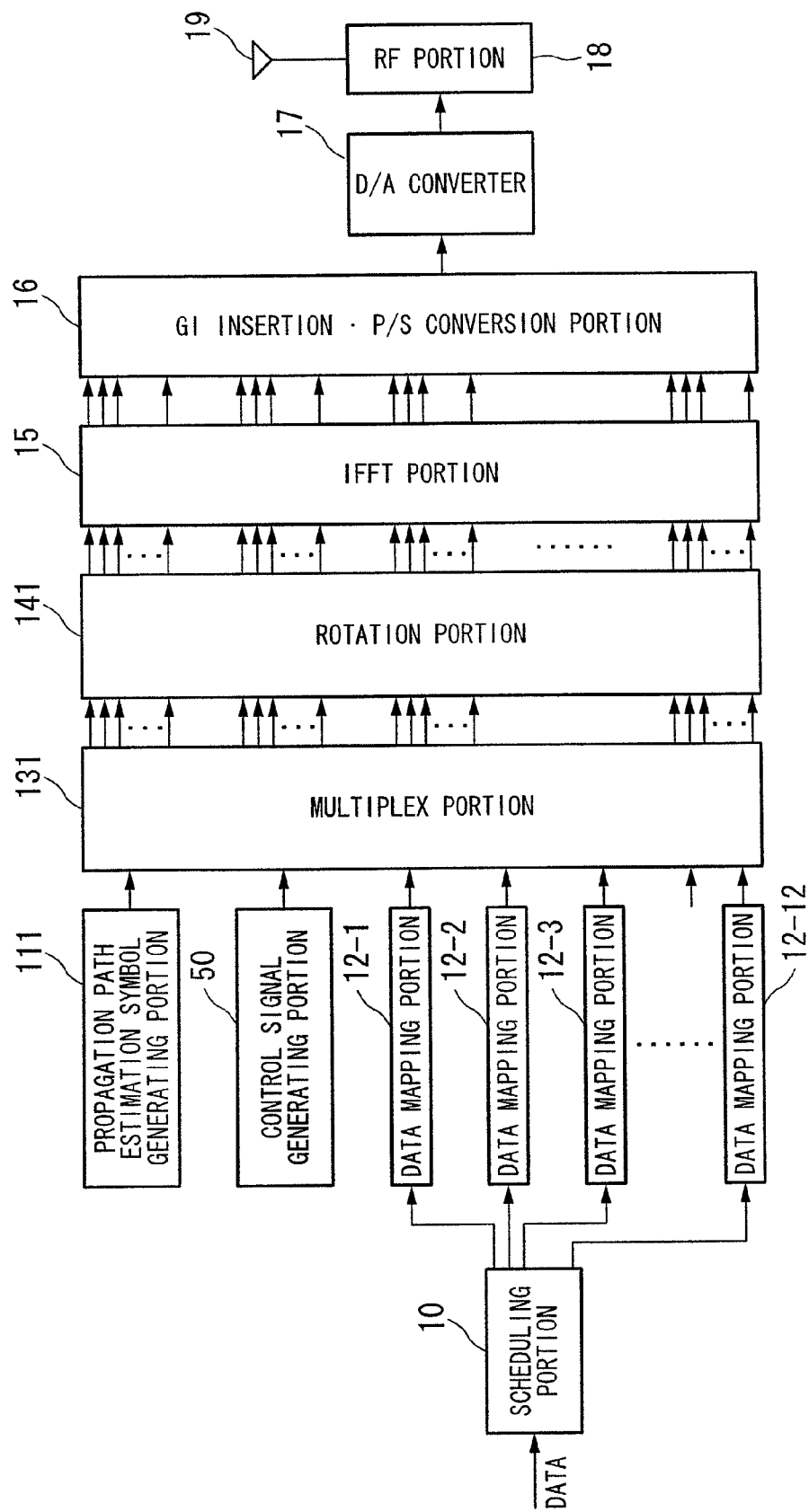
FIG. 10 is a block view that shows the constitution of the transmitter according to the second embodiment of the present invention.

FIG. 10 is a block diagram that shows the transmitter according to the second embodiment of the present invention. Portions that have the same constitution as the transmitter (FIG. 4) shown in the first embodiment are denoted by the same reference numerals, and descriptions thereof shall therefore be omitted. The transmitter of the present embodiment differs from the transmitter according to the first embodiment on the point of having a control signal generating portion 50.

The control signal generating portion 50 is provided because the constitution of the subcarrier for propagation path estimation was altered. Also, the propagation path estimation symbol generating portion was described in the first embodiment as generating symbols for every subchannel. However, in the present embodiment, because the case of not providing rotation in subchannel units is indicated, the propagation path estimation symbol generating portions 11-1 to 11-12 (FIG. 4) are constituted by a single propagation path estimation symbol generating portion 111. Similarly, the multiplex portions 13-1 to 13-12 (FIG. 4) are constituted by a single multiplex portion 131. Also, the rotation portions 14-1 to 14-12 (FIG. 4) are constituted by a single rotation portion 141.

Figure 11:
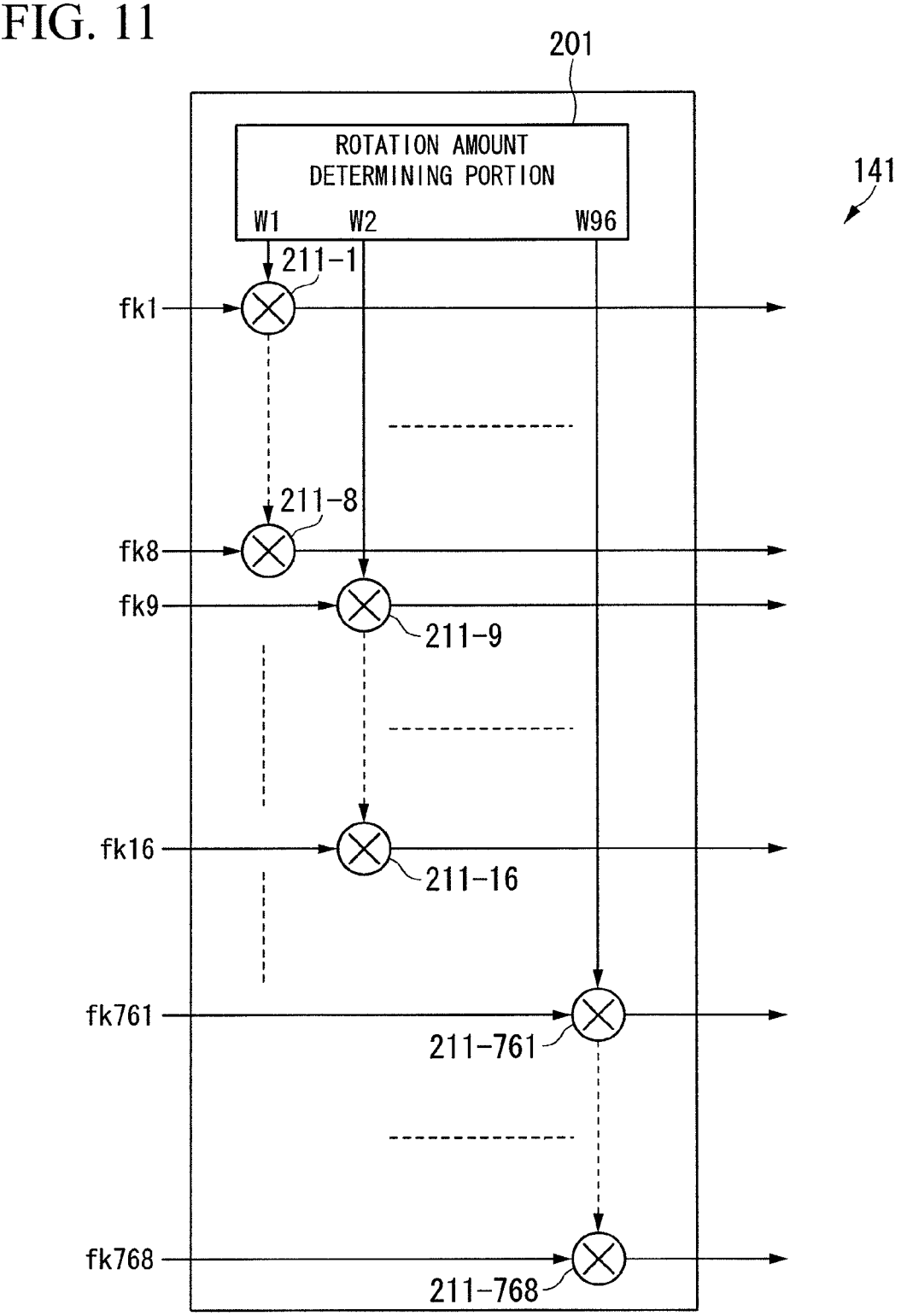
FIG. 11 is an outline view of a rotation portion 14-1 (FIG. 10) according to the second embodiment of the present invention.

FIG. 11 is a configuration diagram of the rotation portion 141 (FIG. 10) according to the second embodiment of the present invention. The rotation portion 141 has a rotation amount determining portion 201, and complex multiplier portions 211-1 to 211-8, 211-9 to 211-16 to 211-761 to 211-768.

The rotation amount determining portion 201 determines rotation amounts W1 to W96 (W1 to W96 being a real number of 1 or a complex number) for every eight subcarriers based on a rotation amount that is defined by the OFDM communication system.

The complex multiplier portions 211-1 to 211-768 multiply input signals fk1 to fk768 and the rotation amounts W1 to W96. For example, assuming that the difference of each phase rotation amount W1 to W96 in the rotation portion 141 of the receiver shown in FIG. 11 is 0, and the difference of the phase rotation amount of the transmitter 3b (FIG. 1A) is 2×π×1×8/1024, when the same signal is transmitted by the same subchannel of each transmitter 3a, 3b, it is possible to receive a combined signal by the receiver.

Also, since the orthogonality of the subcarrier for propagation path estimation is maintained similarly to the first embodiment, in addition to being capable of performing quality estimation or each subchannel of the transmitter, it is also possible to perform quality estimation after combining. That is, it is not necessary to provide the virtual subchannel quality estimating portions 46-1 to 46-12 (FIG. 7) described in the receiver according to the first embodiment. It is therefore possible to simply estimate the quality of each transmitter before combining and the quality after combining.

In the case of applying this system to a base station of a cell that constitutes a sector, if the rotation amount is made to respectively differ for each sector, it is possible to readily estimate the quality of every subchannel from each sector and the quality after combining in any sector edge.

In the present embodiment, however, there is a possibility of the rotation amount being fixed to each transmitter. When there is one rotation amount, it does not necessarily mean it is possible to provide the multi-user diversity effect to all receivers.

Figure 12:
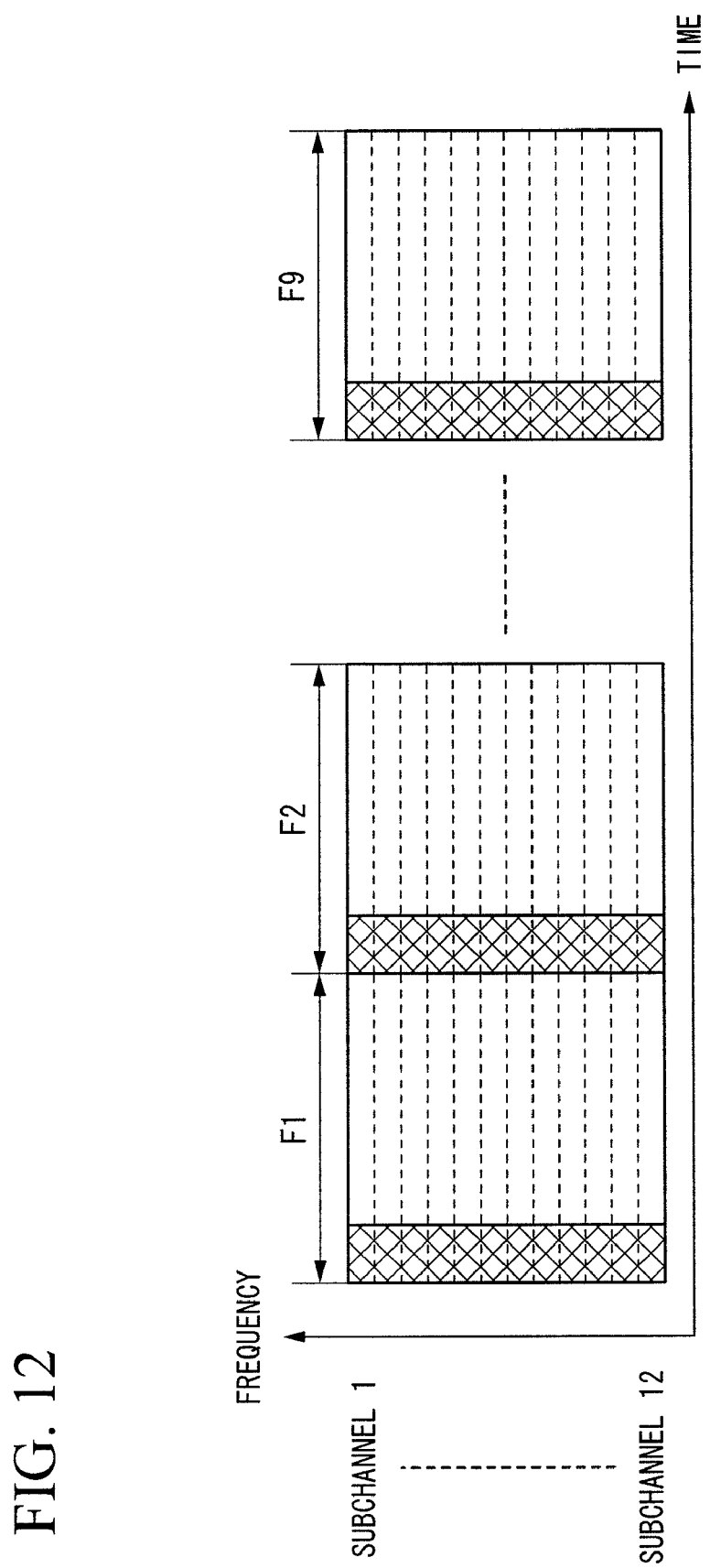
FIG. 12 is a drawing that shows the frame constitution of a signal that is used in the second embodiment of the present invention.

This problem can be solved by using a signal that has the constitution shown in FIG. 12. In FIG. 12, the horizontal axis denotes time and the vertical axis denotes frequency. A constitution of 1 frame is the same as the constitution of the frame already described (FIG. 2A, FIG. 2B), and is constituted at the front by the subcarrier for propagation path estimation that is a known symbol, followed by a plurality of data symbols. FIG. 12 shows the case of constituting one super frame with nine frames F1 to F9.

As one example, the case of setting the difference of the rotation amounts of two transmitters to 1, 2, and 3 will be described. When the rotation amount of the transmitter 3a (FIG. 1A) is always set to 0, by setting the rotation amount in the frames F1 to F3 to 1, the rotation amount in the frames F4 to F6 to 2, and the rotation amount in the frames F7 to F9 to 3, it is possible to realize three rotation amount differences.

In the receiver, by selecting a suitable frame from these frames and a subchannel, it is possible to realize a high-performance OFDM communication system.

Also, when the aforementioned rotation amount is increased, it is possible to expect a frequency diversity effect for that frame. As stated above, when the rotation amounts that are set to 1, 2, 3 are set to 1, 2, 16, so that the rotation amount of the frames F1 to F4 is set to 1, the rotation amount of the frames F5 to F8 to 2, and the rotation amount of the frame F9 to 16, it is possible to expect the frequency diversity effect only for the frame F9. Therefore, in receivers in which the reception quality is extremely bad, and receivers that move fast, by setting so as to preferentially allocate to that frame, it is possible to improve the performance of the entire area.

Also, since it is possible to maintain the orthogonality by multiplying orthogonal code by each subcarrier that is divided into groups, deterioration due to interference of signals that are transmitted from a plurality of transmitters is eliminated, and it is possible to improve the propagation path estimation accuracy.

The receiver that is used in the second embodiment can use nearly the same constitution as the receiver used in the first embodiment (FIG. 6). The point of difference is the code that is set to the reverse spreading being one that multiplies a complex conjugate of Pk (where k is an integer from 1 to 768) by C1 or C2.

Third Embodiment

Next, a third embodiment of the present invention will be described. Although limitations to the orthogonal code used were not added in the first embodiment and the second embodiment, the present embodiment will describe the case of adding limitations to the orthogonal code used to enable a receiver that moves between transmitters to rapidly perform handover.

In the OFDM communication system of the present embodiment, by repeatedly allocating the code C1 to all of the subcarriers and performing 256 sample rotations, (1, j, −1, −j) repeatedly appears at all of the subcarriers. This is made code C12. Also, by similarly rotating 512 times, it becomes (1, −1, 1, −1), and this is made code C13. Also, for 768 rotations, it becomes (1, −j, j, −1), and this is made code C14.

Also, when C1=C11, C11 to C14 are all in an orthogonal relationship. The case of using these codes in the present embodiment shall be described.

In the latter of the examples of constituting the super frame in the second embodiment described above, the orthogonal code used in the transmitter 3a (FIG. 1A) is C11, and the orthogonal code that is used in the transmitter 3b (FIG. 1A) is C12. However, in the second embodiment, since data is inserted between the carriers used in the subcarriers for propagation path estimation, the rotation amount becomes half the previously indicated value.

Figure 13:
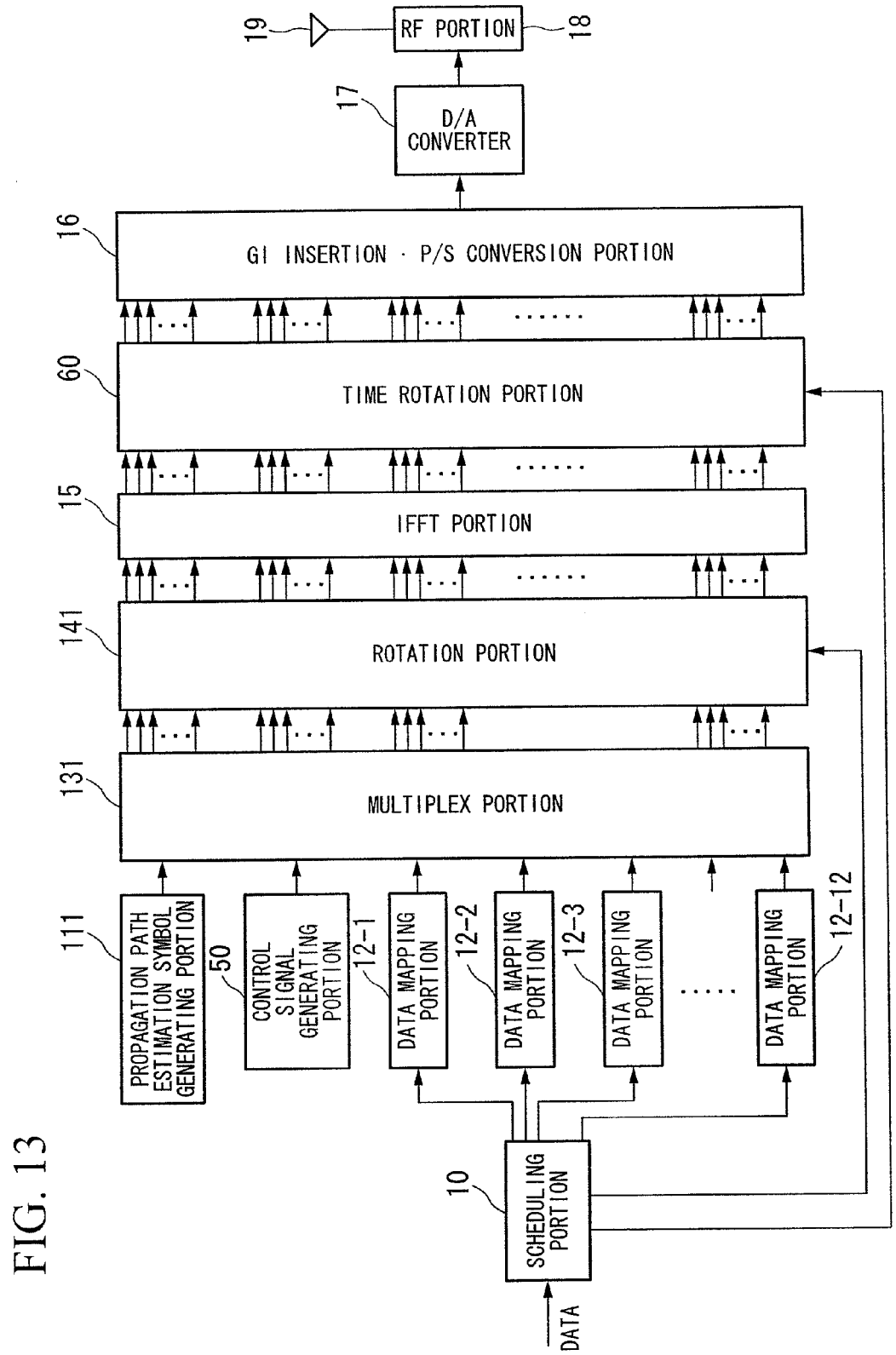
FIG. 13 is a block view that shows the constitution of the transmitter according to the third embodiment of the present invention.

FIG. 13 is a block diagram that shows the constitution of the transmitter according to the third embodiment of the present invention. Portions that have the same constitution as the transmitter (FIG. 10) shown in the second embodiment are denoted by the same reference numerals, and descriptions thereof will therefore be omitted. The transmitter of the present embodiment differs from the transmitter (FIG. 10) according to the second embodiment on the point of having a time rotation portion 60.

The time rotation portion 60 rotates the signal that is output from the IFFT portion 15. Also, the scheduling portion 10 controls whether or not the rotation portion 141 and the time rotation portion 60 are driven. In the super frame that is constituted by nine frames, the operation is the same as that of the second embodiment until the eighth frame and until the subcarrier for propagation path estimation of the ninth frame. Then in the data portion of the ninth frame, the driving of the rotation portion 141 is stopped and the time rotation portion 60 is driven.

Figure 14A:
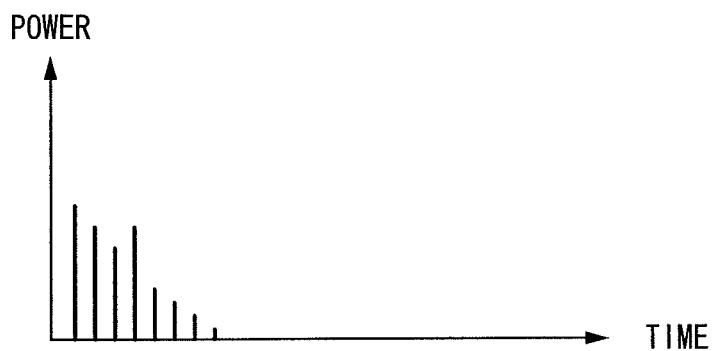
FIG. 14A is a drawing that shows a propagation path of the transmitter 3a (FIG. 1A.
Figure 14B:
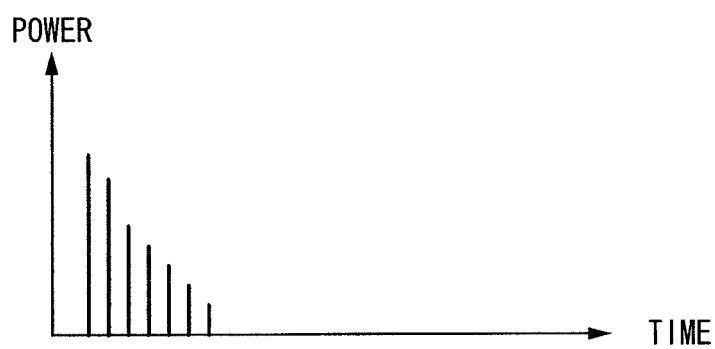
FIG. 14B is a drawing that shows a propagation path of the transmitter 3b (FIG. 1A.
Figure 14C:
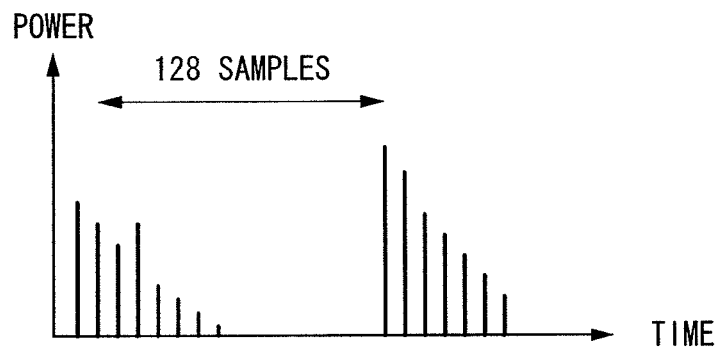
FIG. 14C is drawing that shows a pseudo propagation path in the case of sending the same data from the transmitters 3a, 3b (FIG. 1A).

In the transmitter 3a (FIG. 1A) the time rotation is set to 0, and in the transmitter 3b the time rotation is set to 128. Due to this operation, the rotation amounts of the data symbol and the propagation path estimation symbol that is a known symbol of the respective transmitters agree. When the same data is transmitted from the transmitters in this frame, it is possible to obtain a pseudo propagation path as shown in FIG. 14C, and the frequency diversity effect is therefore obtained. FIG. 14A is the propagation path of the transmitter 3a (FIG. 1A), and FIG. 14B is the propagation path of the transmitter 3b (FIG. 1A).

The receiver that receives this frame does not have a constitution of reverse spreading, and performs conventional demodulation of a type that multiplies a complex conjugate of a subcarrier for propagation path estimation. This is because, since the propagation path estimation symbol is basically generated from the same code, all of the data symbols including the propagation path estimation symbol become the same data.

By using a special code for this orthogonal code, it is possible to realize handover without the receiver being aware of it even when the receiver is moving between transmitters.

Figure 15:
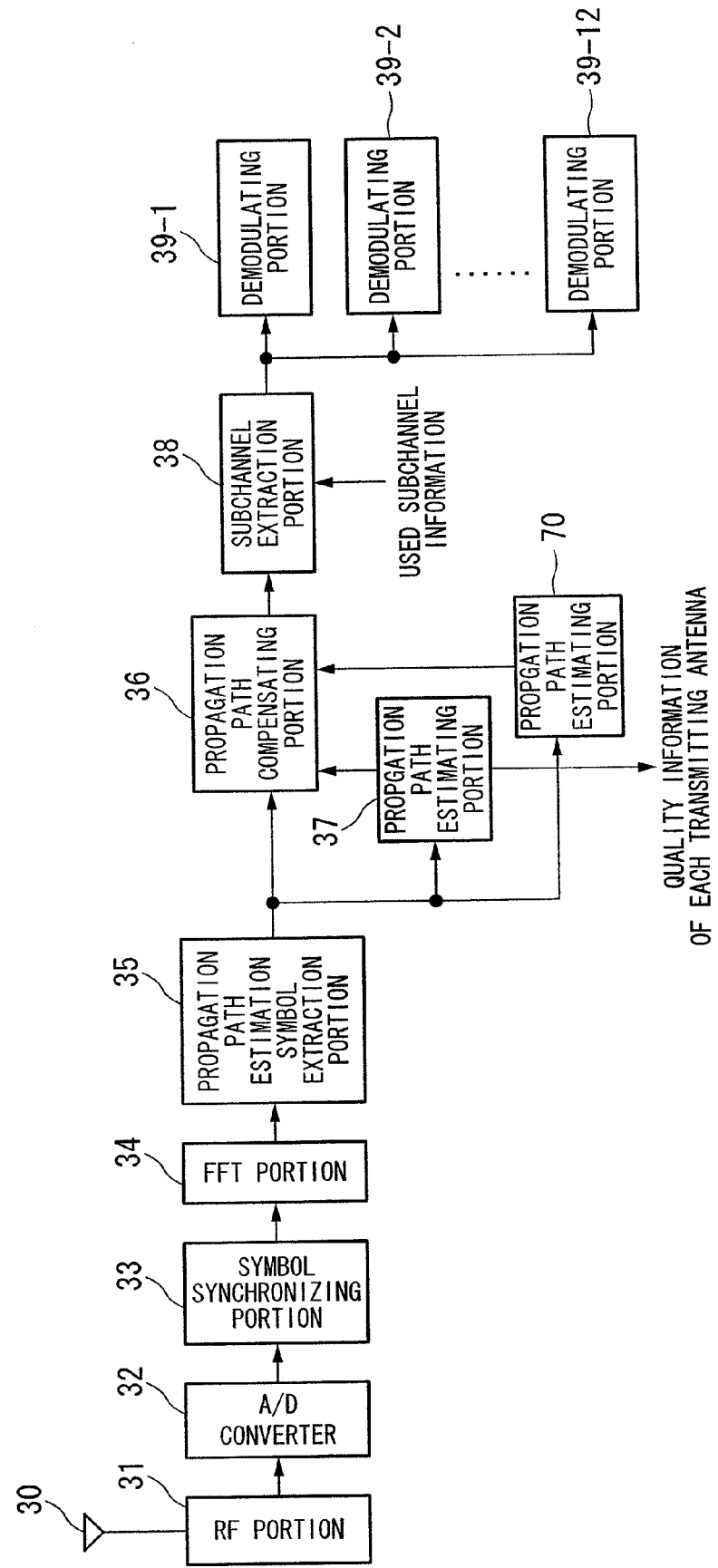
FIG. 15 is a block view that shows the constitution of the receiver according to the third embodiment of the present invention.
Figure 16:
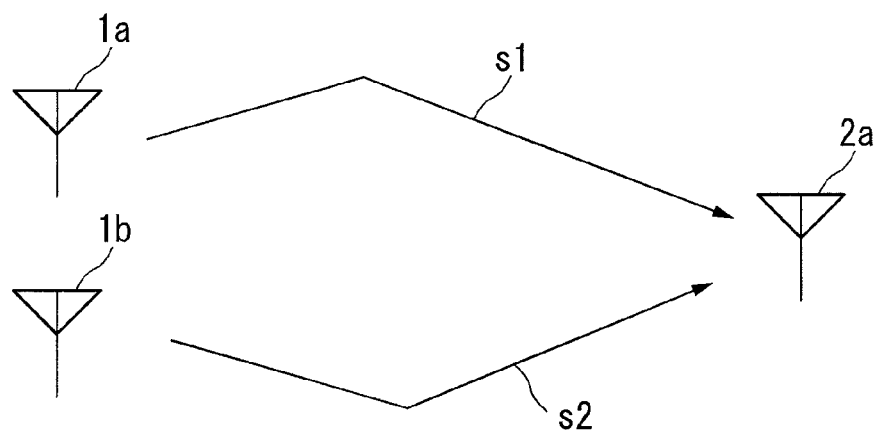
FIG. 16 is a conceptual view that shows the appearance of signals being transmitted from transmitting antennas 1a, 1b that are provided on transmitters belonging to two different sectors to a receiving antenna 2a that is provided on a receiver.
Figure 17A:
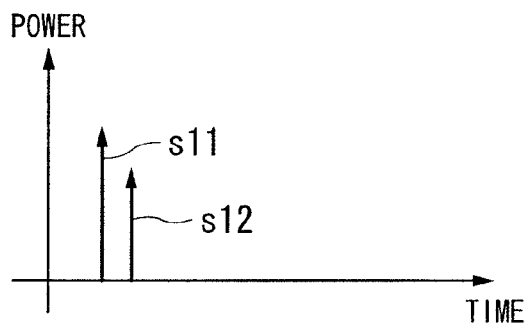
FIG. 17A shows a delay profile h1 that is time-domain representation of the propagation path between the transmitting antenna 1a (FIG. 16) and the receiving antenna 2a (FIG. 16).
Figure 17B:
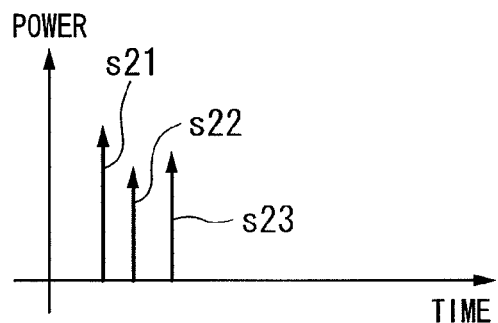
FIG. 17B shows a delay profile h2 that is time-domain representation of the propagation path between the transmitting antenna 1b (FIG. 16) and the receiving antenna 2a (FIG. 16).
Figure 18:
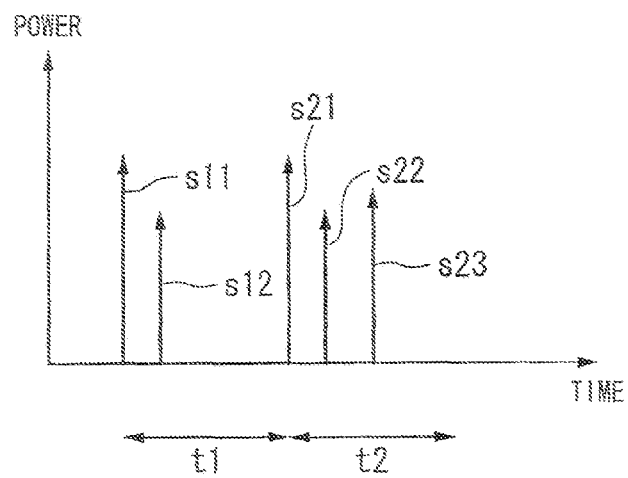
Figure 19A:
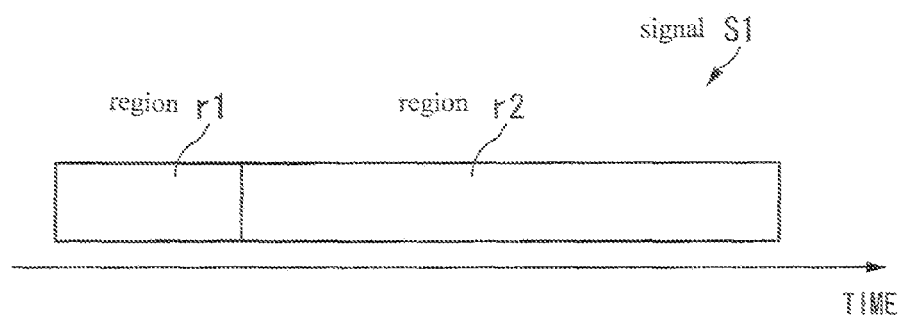
FIG. 19A shows the constitution of a signal s1 that is transmitted from the transmitting antenna 1a (FIG. 16).
Figure 19B:
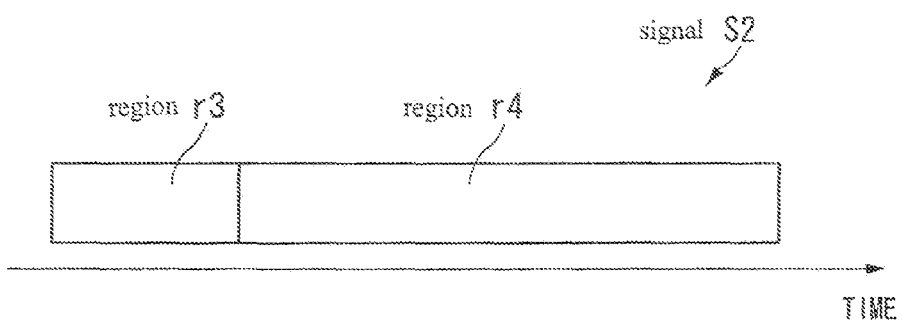
FIG. 19B shows the constitution of a signal s2 that is transmitted from the transmitting antenna 1b (FIG. 16).
Figure 20:
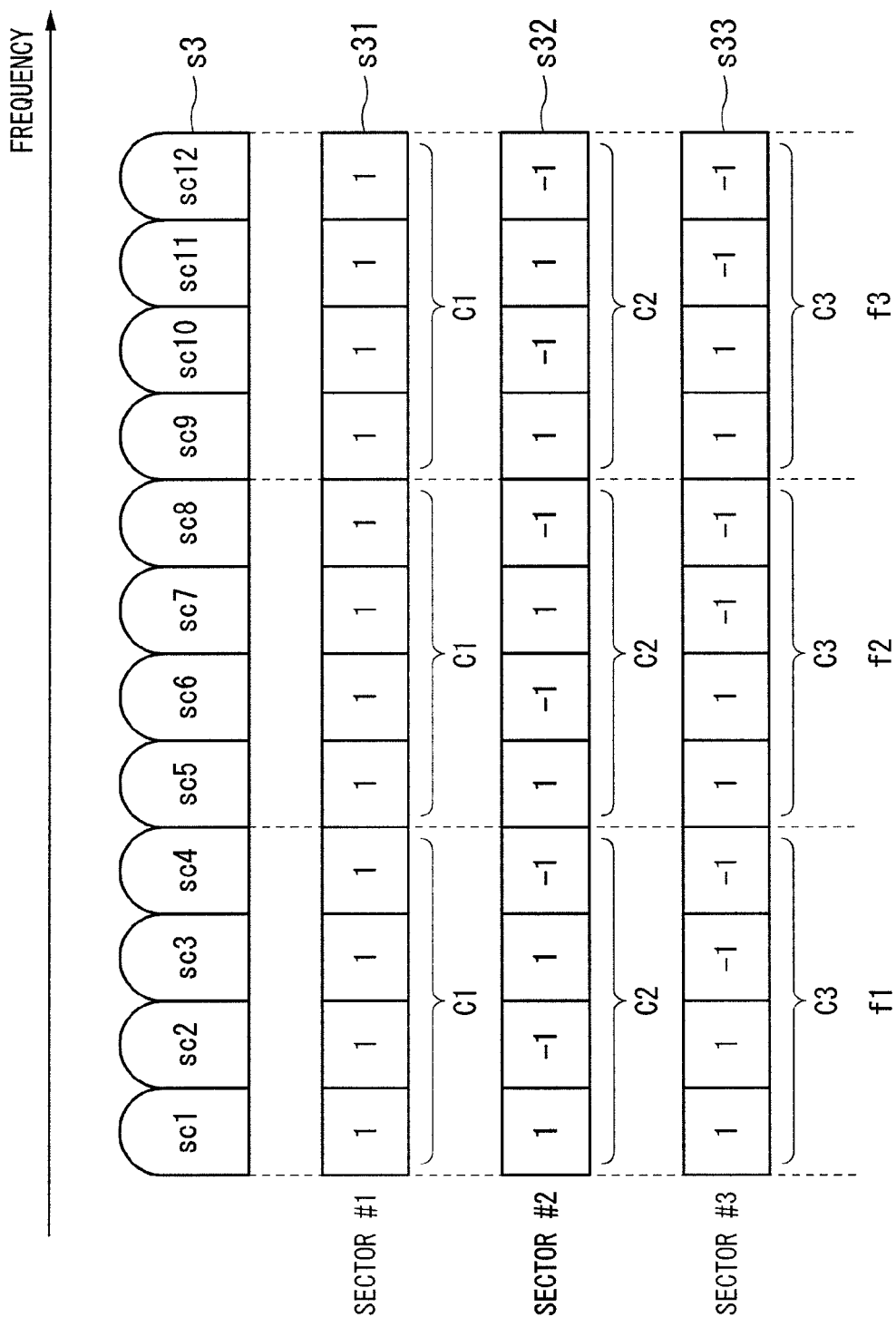
FIG. 20 is a configuration drawing of the signal s3 that is transmitted from transmitters to a receiver.
Figure 21:
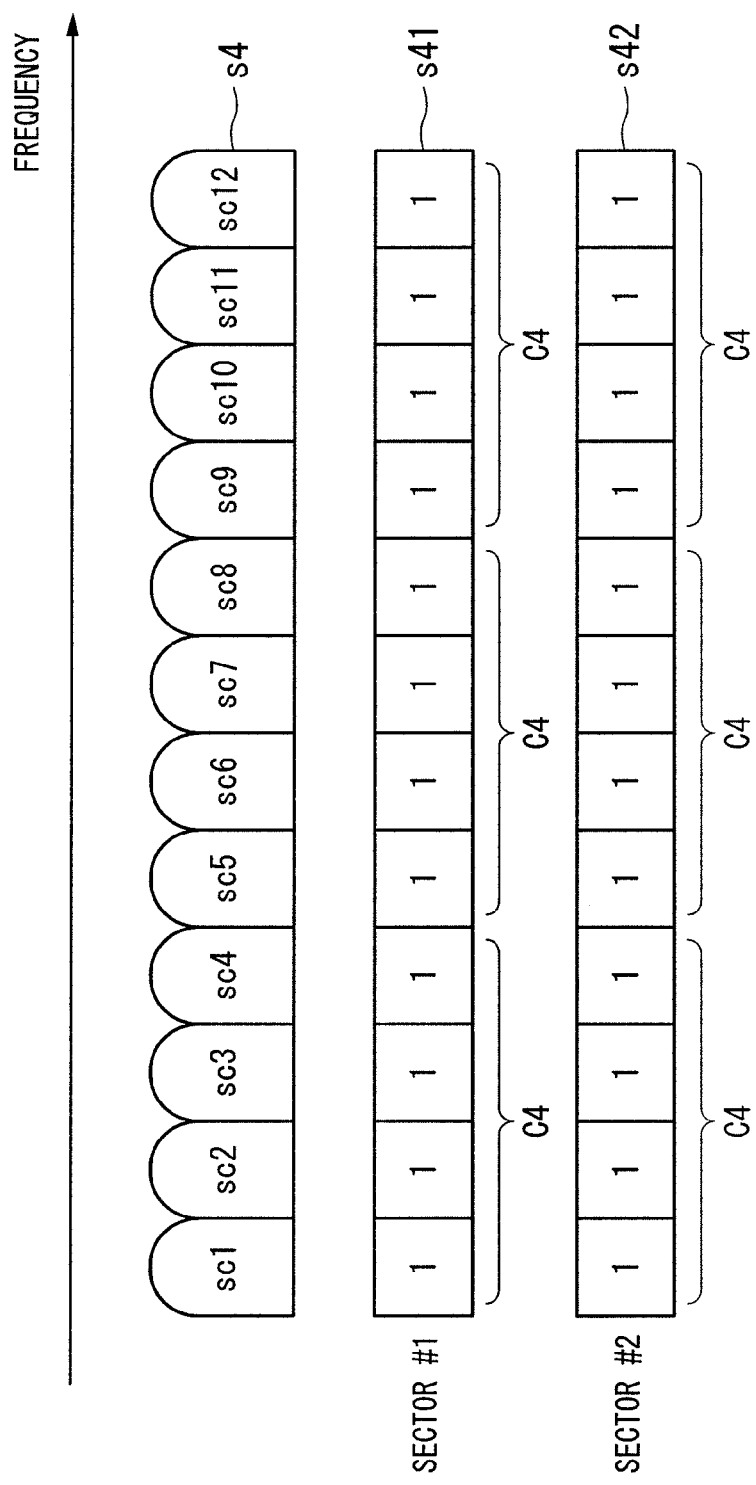
FIG. 21 is a drawing that shows the constitution of the transmission signal s4 in the case of the delay profiles h1=h2=1.

FIG. 15 is a block diagram that shows the constitution of the receiver according to the third embodiment of the present invention. Portions that have the same constitution as the receiver (FIG. 6) of the first embodiment are denoted by the same reference numerals, and descriptions thereof will therefore be omitted. The receiver of the present invention differs from the receiver according to the first embodiment on the point of having a propagation path estimating portion 70.

The propagation path estimating portion 70 finds a propagation path by multiplying data of the reception frequency of the subcarrier for propagation path estimation by the complex conjugate of the code that was used for generating the propagation path estimation symbols. Also, since it is not necessary to measure the power of each subchannel in the frame for frequency diversity, this frame only measures the propagation path and demodulates the data.

Note that it is acceptable to provide in the receiver an FFT portion 34 that performs frequency conversion by a fast Fourier transform on received OFDM symbols in which known symbols are contained. The receiver may have a quality estimating portion (not illustrated) that estimates the quality of radio waves at each antenna besides the propagation path estimating portion 37 that estimates with respect to a plurality of antennas a propagation path that is the frequency response with a transmitting antenna in known symbol units that maintain the orthogonality on transmitter side. The receiver may also have and a quality calculating portion (not illustrated) that calculates the quality of combined propagation paths in the case of providing a predetermined phase rotation to the subcarrier of the OFDM symbol that is transmitted from each antenna from the radio wave quality of each antenna.

The first through third embodiments disclose transmitters that use the OFDMA system which utilizes a frequency band that is constituted by a plurality of subchannels. The transmitters give the same phase rotation to each of the groups configured with a plurality of consecutive subcarriers modulated by a data symbol or a known symbol by complex multiplier portions 21-1 to 21-64, or 211-1 to 211-768 (phase rotating portions), determine the phase rotation amount in subchannel units by the rotation amount determining portion 20 or the rotation amount determining portion 201, and determine the existence of phase rotation in subchannel units by the scheduling portion 10.

By adopting this constitution, it is possible to perform the process of providing rotation to a subchannel in which a symbol for propagation path estimation that is a known symbol is mounted, and not provide rotation to a subchannel in which a data symbol is mounted by the rotation amount determining portion 20. Therefore, the transmitter is not required to provide rotation to all subchannels, and so it is therefore possible to lighten the load of the transmitter.

Note that the transmitter that uses the OFDM system may give the same phase rotation amount to each of the groups configured by a plurality of consecutive subcarriers modulated by a data symbol or a known symbol by complex multiplier portions 211-1 to 211-768 (phase rotating portions), determine the phase rotation amount by the rotation amount determining portion 20 or the rotation amount determining portion 201, and determine the existence of phase rotation in subchannel units by the scheduling portion 10.

By adopting such a constitution, in the case of using the OFDM system, since it is possible to give the phase rotation to subcarriers divided into a plurality of groups, there is no need to perform a receiving process for each subcarrier, and so it is possible to lighten the burden of the processing on the receiver side.

Note that control of the transmitter and receiver may be performed by recording on a computer-readable recording medium a program for realizing the functions of the scheduling portion 10, the propagation path estimation symbol generating portions 11-1 to 11-12, 111, the data mapping portions 12-1 to 12-12, the multiplex portions 13-1 to 13-12, 131, the rotation portions 14-1 to 14-12, 141, the IFFT portion 15, the GI insertion P/S conversion portion 16, the D/A converter 17, the RF portion 18, the control signal generating portion 50, the time rotation portion 60 of FIG. 4, FIG. 10, and FIG. 13, the RF portion 31, the A/D converter 32, the symbol synchronizing portion 33, the FFT portion 34, the propagation path estimation symbol extraction portion 35, the propagation path compensating portion 36, the propagation path estimating portion 37, the subchannel extraction portion 38, and demodulating portions 39-1 to 39-12, reading the program that is recorded on the recording medium into a computer system, and executing it. Note that "computer system" here refers to one that includes an operating system and hardware such as peripheral equipment.

Also, a "computer-readable recording medium" refers to a portable medium such as a flexible disk, magneto-optical disk, ROM, CD-ROM and the like, and a storage device such as a hard disk that is housed in a computer system. The "computer readable storage medium" also includes one for holding the program for a certain time, such as a volatile memory in a computer system which functions as a server or client for receiving the program sent via a network (e.g., the Internet) or a communication line (e.g., a telephone line). Also, the program may be one for realizing a portion of the abovementioned functions, and it is also possible to realize the abovementioned functions in combination with a program that has already been stored in the computer system.

While the preferred embodiments of the invention have been described and illustrated above, specific constitutions are not limited to these embodiments, and designs are also included with a scope that do not depart from the spirit or scope of the present invention.

INDUSTRIAL APPLICABILITY

The present invention can be applied to a transmitter employing an OFDM system.

The invention claimed is:

1. A transmitter in an OFDM system, comprising:
    a phase rotating portion which gives a same phase rotation amount to each group configured with a plurality of consecutive subcarriers,
    wherein the same phase rotation amount given to a first group configured with a plurality of consecutive subcarriers is a different phase rotation amount than the same phase rotation amount given to a second group configured with a plurality of consecutive subcarriers, and
    wherein the phase rotation amount applied to each of the plurality of subcarriers in a group is identical.

2. A transmitting method of a transmitter in an OFDM system, the transmitting method comprising the steps of:
    applying a same phase rotation amount to each group configured with a plurality of consecutive subcarriers,
    wherein the same phase rotation amount given to a first group configured with a plurality of consecutive subcarriers is a different phase rotation amount than the same phase rotation amount given to a second group configured with a plurality of consecutive subcarriers, and
    wherein the phase rotation amount applied to each of the plurality of subcarriers in a group is identical.

* * * * *